(12) United States Patent
Wright et al.

(10) Patent No.: US 6,282,424 B1
(45) Date of Patent: Aug. 28, 2001

(54) RESOURCE CONTROLLERS FOR USE IN A NON-UNITARY SERVICE SYSTEM

(75) Inventors: Andrew S. Wright; Helen R. Newton, both of Vancouver (CA); Carl Mansfield, Colorado, CO (US)

(73) Assignee: Opuswave Networks, Inc., Colorado Springs, CO (US)

( * ) Notice: Subject to any disclaimer, the term of this patent is extended or adjusted under 35 U.S.C. 154(b) by 0 days.

(21) Appl. No.: 08/886,853

(22) Filed: Jul. 1, 1997

(51) Int. Cl.[7] ...................................................... H04Q 7/38
(52) U.S. Cl. .......................... 455/450; 455/452; 455/453; 455/454; 455/466; 370/329; 370/468
(58) Field of Search ..................................... 455/445, 446, 455/528, 453, 454, 450, 451, 452, 466; 370/336, 329, 337, 345, 468

(56) References Cited

U.S. PATENT DOCUMENTS

| | | | |
|---|---|---|---|
| 5,355,616 | 10/1994 | Herold et al. ....................... | 455/34.1 |
| 5,363,427 | 11/1994 | Ekstrom et al. ....................... | 379/58 |
| 5,579,372 | 11/1996 | Astrom ................................... | 379/58 |
| 5,802,456 | 9/1998 | Hulsebosch ........................... | 455/63 |

Primary Examiner—William Trost
Assistant Examiner—Philip J. Sobutka

(57) ABSTRACT

Apparatus for controlling the blocking of a network-supported primary service by a network-supported secondary service sharing the same network router/switch.

A controller included in the network's switch/router operates by identifying for each secondary service connection request the likelihood that if it is allocated a router/switch server, a subsequent primary service connection request will be blocked, i.e., denied a server allocation of its own. If the controller determines it is unlikely that allocating a secondary service connection request a server will cause a subsequent primary service connection request to be blocked, it allocates an idle server to a currently pending secondary service connection request at the router/switch. If, however, the controller determines that it is likely that allocating a secondary service connection request a server will cause a subsequent primary service connection request to be blocked, it blocks any pending secondary service connection requests at the router/switch from being allocated a server at that time.

21 Claims, 22 Drawing Sheets

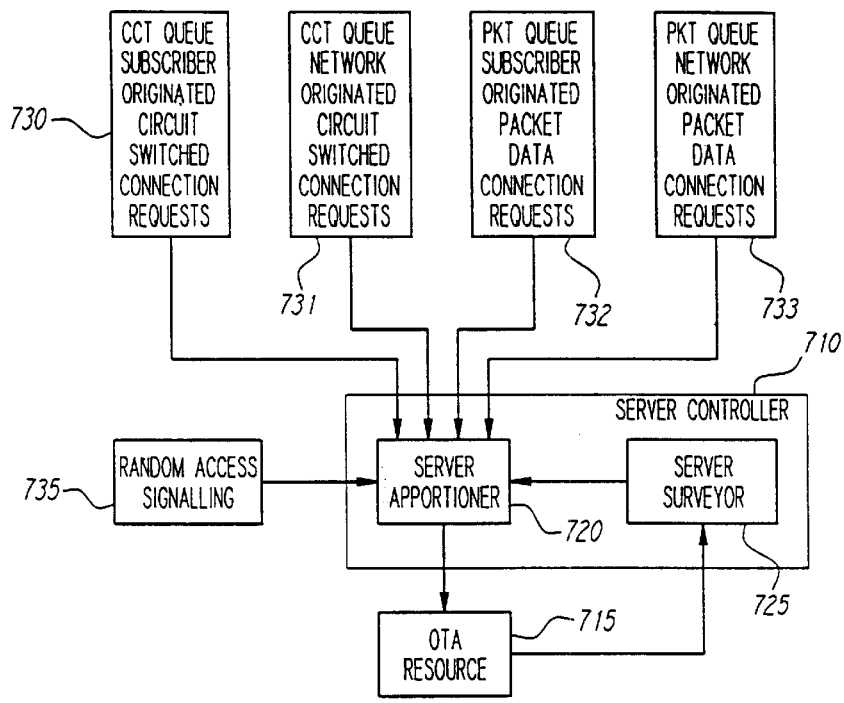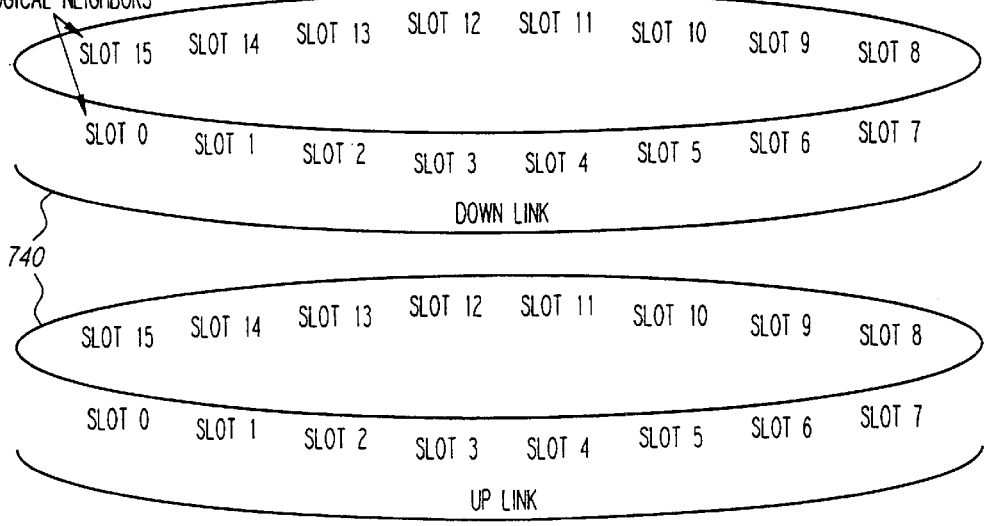
FIG. 7

| TEST CONDITIONS | RESERVED HEADROOM (NO OF SERVERS) | PRIMARY SERVICE BLOCKING | SECONDARY SERVICE BLOCKING | PRIMARY SERVICE OTA UTILIZATION | SECONDARY SERVICE OTA UTILIZATION |
|---|---|---|---|---|---|
| REFERENCE POINT<br>NETWORK CCT ARRIVAL RATE = 1 EVERY 20 SECS<br>SUBSCRIBER CCT ARRIVAL RATE = 1 EVERY 20 SECS<br>CCT SWITCHED SERVICE TIME = 120 SECONDS | N/A | 0.0 | N/A | 47.5% | N/A |
| TEST POINTS<br>NETWORK CCT ARRIVAL RATE = 1 EVERY 20 SECS<br>SUBSCRIBER CCT ARRIVAL RATE = 1 EVERY 20 SECS<br>CCT SWITCHED SERVICE TIME = 120 SECONDS<br><br>NETWORK PACKET DATA ARRIVAL RATE = 2 EVERY 1 SEC<br>SUBSCRIBER PACKET DATA ARRIVAL RATE = 2 EVERY 1 SEC<br>PACKET DATA SERVICE TIME = 2 SECONDS | 0 | 4.1% | 4.6% | 48.8% | 29.8% |
| | 1 | 3.4% | 5.2% | 46.2% | 26.8% |
| | 2 | 2.3% | 6.1% | 45.6% | 26.5% |
| | 3 | 1.35% | 7.5% | 49.4% | 26.2% |
| | 4 | 0.65% | 8.5% | 48.6% | 24.0% |
| | 5 | 0.3% | 12.7% | 48.6% | 20.1% |

*FIG. 14* probability_of_N_terminating(N,μ,t$_{obs}$)
/* this subroutine computes the 95% chance that an integer number n of N
   connections in progress with average service time μ will terminate
   during the observation time interval t$_{obs}$; the subroutine reports an
   integer to the calling routine */
{
/* initialize decision variable */
number_connections_terminating = 0
for i = 1,2,..N
    {/* compute the probability of i out of N connections terminating.
        Utilize equations 2 and 3 */
    prob_i_terminating$_i$ = probability_terminate(i,N,μ,t$_{obs}$)
    }
/* this section essentially computes the cumulative density function */
percentile_prob_i_terminating$_N$ = prob_i_terminating$_N$
for i = N-1,N-2,..1
    {
    percentile_prob_i_terminating$_i$ = percentile_prob_i_terminating$_{i+1}$ +
        prob_i_terminating$_i$
    }
/* determine the maximum number of terminating connections with a
    probability of termination greater than 0.95 */
for i = 1,2,..N
  {
  if percentile_prob_i_terminating$_i$ > 0.95
      then number_connections_terminating = i
  }
return number_connections_terminating /* n */

Resource_estimator(blocking_threshold, observation_time, OTA_resource)
/* this routine computes the reserved headroom that should be maintained
   if a particular blocking threshold is to be achieved */
{
/* call the services of the resource identifier to determine the number of
   primary and secondary service connections in progress */
/* number of primary service connections in progress */
Np = Resource_Identifier(primary, OTA_resource)
/* number of secondary service connections in progress */
Ns = Resource_Identifier(secondary, OTA_resource)
/* call the services of the resource monitor to determine the connection
   statistics */
$\mu_p$ = Resource_Monitor /* average primary service time */
$\mu_s$ = Resource_Monitor /* average secondary service time */
$\lambda_p$ = Resource_Monitor /* average primary service arrival rate */
$\lambda_s$ = Resource_Monitor /* average secondary service arrival rate */
/* initialize decision variable */
prob_blocking = zero
for no_primary_service_arrivals = 1,2,...max_no_primary_service_arrivals
    /* max_no_primary_service_arrivals = 25 for presently preferred system
       */
    {
    /* compute the number of idle servers, i.e., empty slot pairs, which is
       the sum of currently idle servers and the number of servers that are
       likely to terminate with a 95% probability within the observation time
       window */
    Np_terminate_95% = probability_of_N_terminating
       (Np,$\mu_p$,observation_time)
    Ns_terminate_95% = probability_of_N_terminating
       (Ns,$\mu_s$,observation_time)
    no_empty_slots = (max_slots − Np − Ns) + Np_terminate_95% +
       Ns_terminate_95%
    /* compute the probability of blocking for the hypothesized number of
       primary service arrivals */
    if no_primary_service_arrivals > no_empty_slots
       then prob_blocking = prob_blocking +
Prob_primary_arrival(no_primary_service_arrivals, $\lambda_p$, observation_time)

```
    else prob_blocking = prob_blocking + zero
    }
/* if the estimated blocking probability exceeds a service provider defined
   threshold, then secondary service connection requests should not be
   granted; however, if the blocking threshold has not been violated, it is
   permissible to let the resource allocator serve one secondary service
   connection request */
if prob_blocking > blocking_threshold     ◄────1802
    /* just enough idle servers are available for the primary service */
    then reserved_headroom = (max_slots − Np − Ns)
    /* a secondary service connection request may be allocated a server */
    else reserved_headroom = (max_slots − Np − Ns) − 1
return reserved_headroom
}
```

*Fig. 18b*

RESOURCE CONTROLLERS FOR USE IN A NON-UNITARY SERVICE SYSTEM

FIELD OF THE INVENTION

The field of this invention pertains to telecommunications, including a telecommunications network that uses a primary circuit switched service in conjunction with other services.

DESCRIPTION OF THE TECHNOLOGY

In an ideal telephone switch system, arriving connection requests, i.e, calls, are immediately allocated a telephone line. That is, arriving connection requests are immediately served when a "server," i.e., a connection path, is available; otherwise, the connection request is denied.

The utilization of a telephone switch system can be driven arbitrarily close to one-hundred percent (i.e., an ideal telephone switch system) when the rate at which connection requests are placed with the switch is equal to or greater than the duration of any one connection in progress at the switch. At first glance, this appears desirable, as the system is maintained full with revenue-bearing traffic. However, the penalty paid for such a scenario is that the associated "call blocking rate," i.e., the connection request denial rate, can become unacceptably high. This can occur because, in order that a high utilization of the available server capacity is achieved, the service provider only provides enough connection resources to satisfy the average or lowest rate of call requests, thereby ensuring that upon termination of a call connection that is currently in progress, a new connection request is available to utilize the now available connection resource. The service time, however, is usually significantly longer than the "inter-arrival time," i.e., the time between connection request arrivals at the switch. This high utilization situation is intrinsically unacceptable from a system user's perspective, as the high utilization means a correspondingly higher blocking rate, since if the inter-arrival time is greater than or equal to the service time, service requests will not be immediately serviced, resulting in the now all-to-familiar "all circuits are busy, please try your call again later" message. Generally, to ensure satisfactory customer service, service providers provide excess connection resources so that the worst case chance of a connection becoming denied is low, typically on the order of one-tenth of one percent to one percent. For an exemplary twenty-five server system, this corresponds to an average utilization of the available system capacity that ranges between forty to sixty percent, depending on the service time of the system's traffic.

The observation that the average utilization of the available system capacity lies between forty to sixty percent for small server systems has provided motivation to seek methods of utilizing the "unused;" i.e., available, system capacity. This, in turn, has resulted in the introduction of a secondary packet data service that shares the same switch/router with the primary, i.e., circuit switched, service.

The introduction of a secondary service is based on the notion that this secondary service has a significantly shorter service time than that of the primary service and, in addition, the secondary service time is comparable to or shorter than the arrival rates of the primary service connection requests. Under these conditions, the secondary service should appear transparent to the users of the primary service because, although the unused system capacity is utilized by the secondary service, the connection resources used by the secondary service should be used and released before a blocking event, i.e., a primary service connection request denial, occurs. However, in reality, this is only true in a few highly optimized scenarios and, in general, the introduction of a secondary service may cause the primary service blocking rate to increase.

In an effort to reduce high blocking rates for the primary service, service providers have held primary service connection requests for a short period of time until a server becomes available to which they may be allocated, the short period of time preferably comparable to the time to service a secondary connection in progress. However, this solution is only completely successful if the average service time of the secondary service is sufficiently short that a primary service user will not perceive the waiting period required for a server to become available. Yet, if the maximum permitted waiting time for a dial tone for the primary service is less than the generally preferred maximum waiting time of a quarter of a second, the constraints upon the secondary service times become unduly severe, necessitating very short secondary service data packets.

Thus, while the introduction of a secondary service may increase system utilization, it may also significantly increase the chance that a primary service connection request will be blocked. This undesirable characteristic may be inherent in the system even if the primary service connection requests are handled in a preferential manner.

Thus, it would be advantageous to provide a telecommunications system with high utilization that handled both primary and secondary services while maintaining a low primary service blocking rate below the secondary service blocking rate.

SUMMARY OF THE INVENTIONS

The present inventions provide a telecommunication system with a high utilization percentage and that handles a primary service and other services while maintaining a low primary service connection request blocking rate. The inventions comprise apparatus and methods for employing a controller in a network switch or router that enables the network to support a primary service and other services while minimizing the blocking rate of its primary service connection requests.

In a preferred embodiment, a controller gives priority to the primary service connection requests, allocating each pending primary service connection request to an idle server before it allocates a secondary service connection request to an idle server. When the controller determines to process a secondary service connection request, it first checks if the allocation of a server to the secondary service connection request will reduce a threshold of servers reserved for use by the primary service. The threshold of reserved servers is a number of servers maintained for the primary service's use. If the server allocation to the secondary service connection request will not reduce the threshold of reserved servers, the controller allocates an idle server to the secondary service connection request. If, however, the server allocation to the secondary service connection request will reduce the threshold of reserved servers, the controller denies a server allocation to the secondary service connection request, thereby blocking the secondary service connection request.

Thus, a general object of the present inventions is to support a low primary service blocking rate on a network that handles both a primary and a secondary service. Other and further objects, features, aspects and advantages of the present inventions will become better understood with the following detailed description of the accompanying drawings.

BRIEF DESCRIPTION OF THE DRAWINGS

FIG. 7 is a block diagram of a base station in a dual service network.

FIG. 14 is a table depicting the results of varying the reserved headroom for a base station utilizing a resource threshold controller in accordance with the present inventions.

FIG. 17 is pseudo code for a "probability_of_N_terminating" subroutine employed in accordance with the present inventions.

DESCRIPTION OF THE PREFERRED EMBODIMENTS

Figure 1:
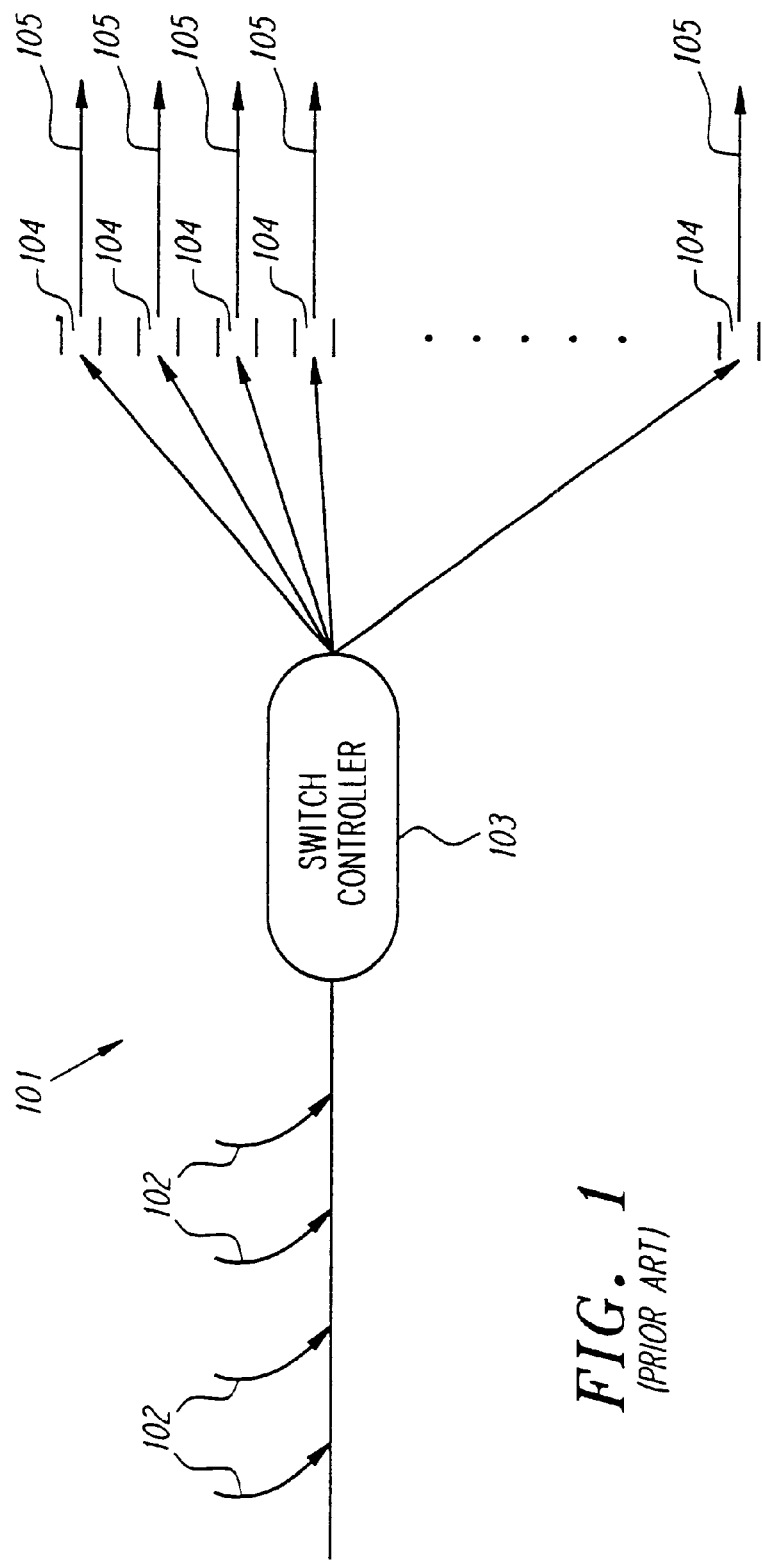
FIG. 1 is a block diagram of a typical known switch/router.

Referring to FIG. 1, a typical M/M/m server system 101 is shown, wherein a plurality of connection requests 102 are received by a switch controller 103. A connection request 102 is allocated a respective server 104, i.e., connection path, by the switch controller 103 if a server 104 is available. When a connection request 102 is allocated a respective server 104, it becomes a connection in progress 105. If a server 104 is not available, however, the switch controller 103 denies the connection request 102.

The M/M/m nomenclature of an M/M/m server system 101 describes the characteristics of the server system 101. The first upper case letter "M" comprises the nature of the arrival process, whereby "M" indicates poisson, and "G" indicates general. The second upper case letter "M" comprises the statistical distribution of the service time associated with the arriving server system connection requests, whereby "M" indicates exponential, "G" indicates general, and "D" indicates deterministic. The final, lower case letter "m" comprises the maximum number of servers 104 available in the switch controller 103.

Figure 2A:
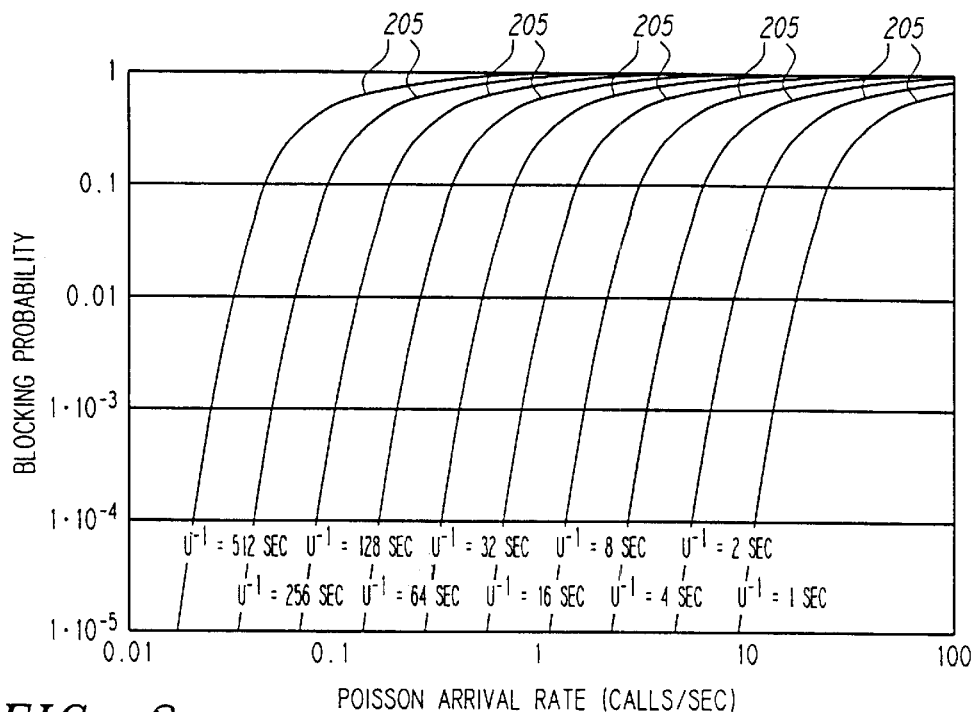
FIG. 2a is a graph of Erlang-B blocking curves for a 25 server system.

If the arrival rate of the connection requests 102 are characterized by a poisson process and each respective connection in progress 105 has a service time that is drawn from an exponential distribution, then Erlang-B blocking and utilization curves may be used to determine the utilization of the available capacity of servers 104 of the switch controller 103, and the rate at which connection requests 102 are denied. FIG. 2a depicts exemplary Erlang-B blocking curves 205 for a small, maximum twenty-five server, server system and FIG. 2b depicts exemplary Erlang-B utilization curves 210 for a small server system also comprised of a maximum of twenty-five servers.

Figure 2B:
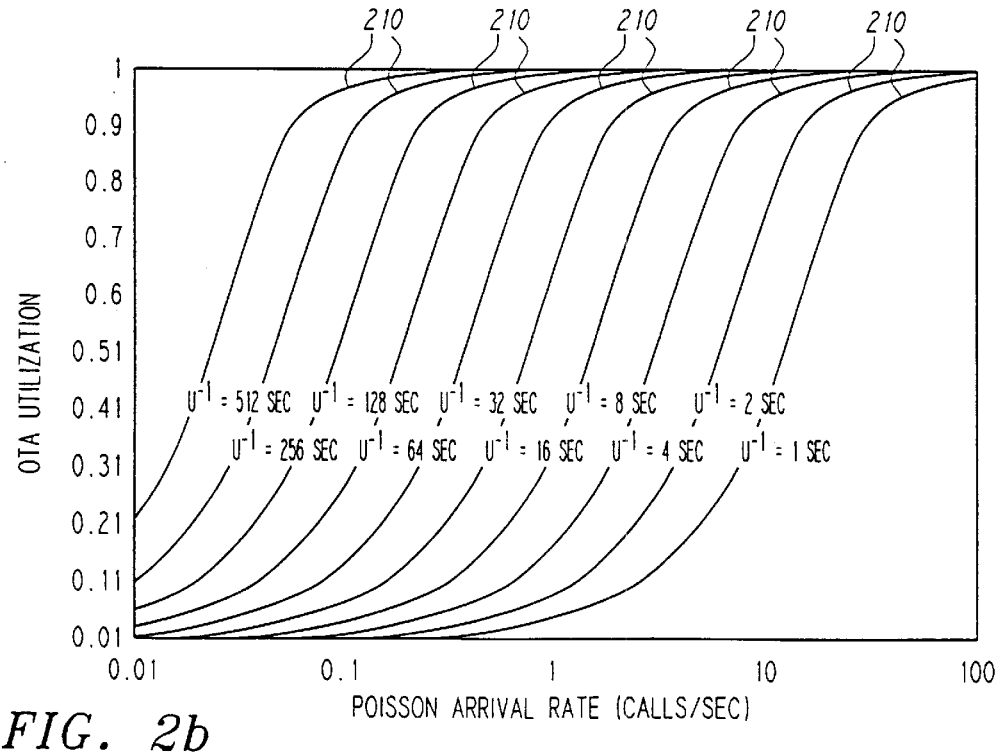
FIG. 2b is a graph of Erlang-B utilization curves for a 25 server system.

The Erlang-B utilization curves 210 of FIG. 2b reveal that server utilization can be arbitrarily close to one-hundred percent when the rate at which connection requests are placed with the respective switch controller is relatively high. The penalty paid for this situation, however, as seen with the Erlang-B blocking curves 205 of FIG. 2a, is that the associated blocking rate of service connection requests becomes unacceptably high. Thus, known systems, to ensure satisfactory subscriber service, generally ensure that the worst case chance of a connection request being denied, i.e., blocked, is approximately one-tenth to one percent. For an exemplary twenty-five server system, this corresponds to a forty to sixty percent average utilization of the available server capacity.

Figure 3:
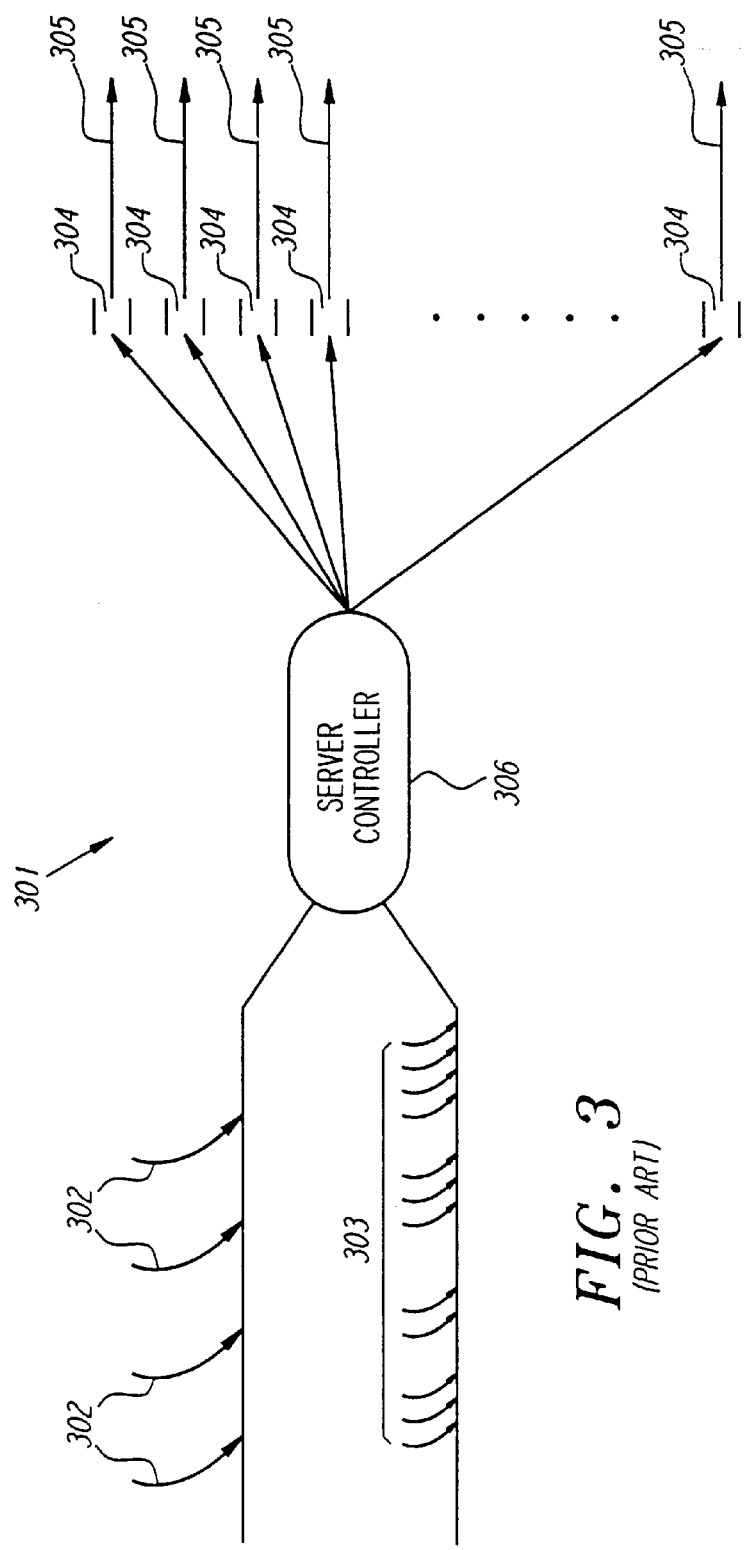
FIG. 3 is a block diagram of a known dual service switch/router.

Forty to sixty percent server utilization for small server systems provided the motivation to add a secondary packet data service to these server systems, the secondary service sharing the same switch/router with the primary circuit-switched service. Referring to FIG. 3, a dual service switch/router 301 is comprised of a server controller 306. A plurality of primary service connection requests 302 are received by the server controller 306. The primary service is a circuit switched service, which may include voice, i.e., telephone, messages, and is generally characterized by relatively low connection request arrival rates and relatively long connection in progress service times.

A primary service connection request 302 is allocated a respective server 304 by the server controller 306 if a server 304 is available, and it then becomes a connection in progress 305. If a server 304 is not available, however, the server controller 306 blocks the primary service connection request 302. In an alternative embodiment, the server controller 306 temporarily holds the primary service connection request 302, i.e., holds the primary service connection request 302 for a specific, lifetime, time, in the event a server becomes available to service it, prior to making the decision to discard it because a server 304 is not available for it.

A plurality of secondary service connection requests 303 are also received by the server controller 306. The secondary service is a packet data service, which may consist of data messages, and is generally characterized by relatively high connection request arrival rates and relatively short connection in progress service times. A secondary service connection request 303 is allocated a respective server 304 by the server controller 306 if a server 304 is available and if there are no primary service connection requests 302 pending at the server controller 306. As with a primary service connection request 302, when a secondary service connection request 303 is allocated a respective server 304, it becomes a connection in progress 305. If, however, a server 304 is not available, or there is at least one primary service connection request pending at the server controller 306, the server controller 306 blocks the secondary service connection request 303. In an alternative embodiment, the server controller 306 temporarily holds the secondary service connection request 303, i.e., holds the secondary service connection request 303, for a specific, lifetime, time, in the event a server becomes available to service it, prior to making the decision to discard it because a server 304 is not available for it.

Figure 4:
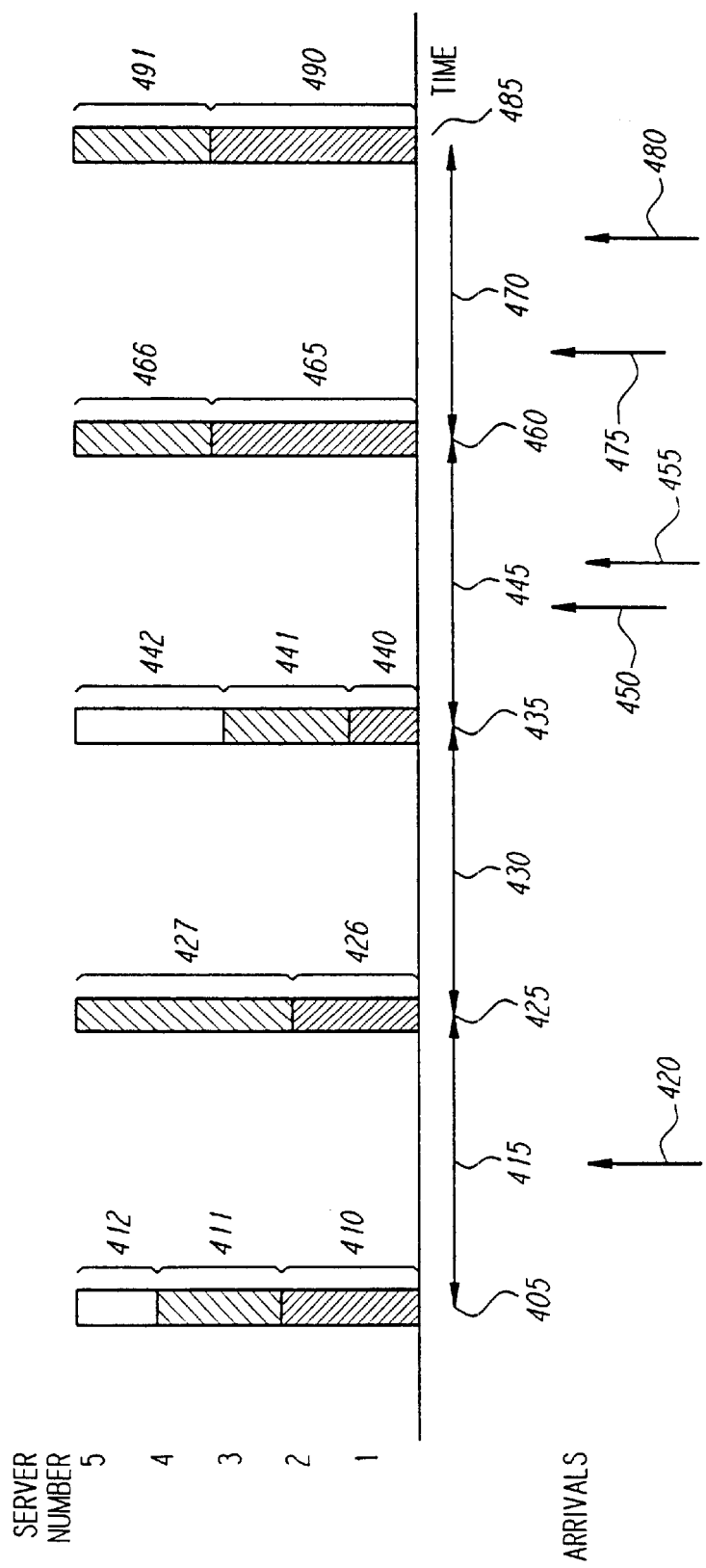
FIG. 4 is a graph depicting a primary service blocking event for a dual service server system.

Referring to FIG. 4, a primary service, consisting of voice, and a secondary service, consisting of data, are simultaneously served in an exemplary five-server system. At time 405, there are two primary service connections in progress 410, two secondary service connections in progress 411, and one remaining "idle," i.e., unused, server 412. During a first time interval 415, the system receives one secondary service connection request 420. As there is one unused server 412 and no primary service connection requests pending, the server controller allocates the unused server 412 to the secondary service connection request 420. Thus, at time 425, there are two primary service connections in progress 426, three secondary service connections in progress 427, and no idle servers remain.

During a second time interval 430, one primary service connection in progress and one secondary service connection in progress are terminated and no primary or secondary service connection requests are received by the system. Thus, at time 435, there is one primary service connection in progress 440, two secondary service connections in progress 441, and two idle servers 442 remain.

During a third time interval 445, the system receives two primary service connection requests 450 and three secondary service connection requests 455. The primary service connection requests are given priority, and thus, the respective server controller allocates each of the two primary service connection requests 450 an idle server. As there are a maximum of five servers in the system and all five are now allocated, the server controller blocks the three secondary service connection requests 455. Thus, at time 460, there are three primary service connections in progress 465, two secondary service connections in progress 466, and no idle servers remain.

During a final, fourth, time interval 470, the system receives one primary service connection request 475 and four secondary service connection requests 480. As there are no idle servers available, the system blocks the primary service connection request 475 and the four secondary service connection requests 480. Thus, at time 485, there remains three primary service connections in progress 490, two secondary service connections in progress 491, and no idle servers. If, however, the system did not support the secondary service, the primary service connection request 475 would have been allocated a server, as the two servers allocated to the two secondary service connections in progress 466 at time 460 and 491 at time 485 would be idle. Thus, the introduction of a secondary service into the system has resulted in a primary service connection request being blocked.

Figure 5:
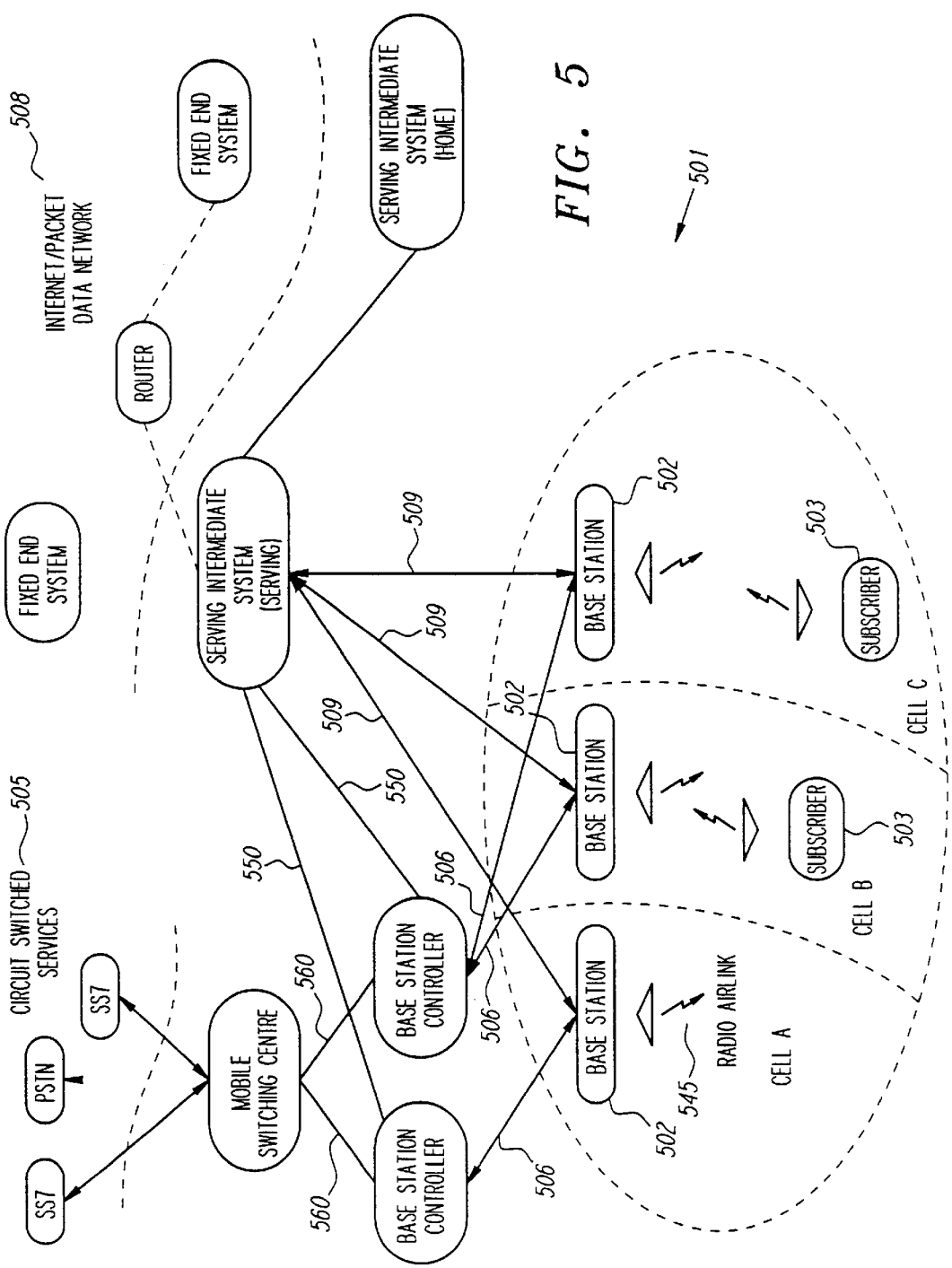
FIG. 5 is a block diagram of a dual service network.

A presently preferred embodiment of a dual service server system in accordance with the present inventions is a network 501 of FIG. 5 which supports both a primary, circuit switched, service and a secondary, packet data, service. In a presently preferred embodiment, network 501 is a wireless network. Alternative network embodiments include wireline or wireless/wireline, including local area networks ("LAN"s) and wide area networks ("WAN"s). Additionally, there is no requirement that the network support only two services. For example, a tri-service server system base station could be used in a network supporting, e.g., voice, data, and video on demand.

The network 501 is comprised of a plurality of base stations 502 which communicate with a plurality of network subscribers 503 via an over-the-air communication link 545, i.e., radio airwaves. Each base station 502 has a primary service interface (not shown) which connects the base station 502 to a base station controller 555, via a communication link 506. Each base station controller 555 is also linked, via a communication link 560, to a circuit switched network 505. The circuit switched network 505 may be a GSM network or a POTS network. The communication links 506 may include a coaxial cable, a fiber optic cable, a digital radio link, or a telephone line. The communication links 560 may include a coaxial cable, a fiber optic cable, a digital radio link, or a telephone line.

Each base station 502 also has a secondary service interface (also not shown) which connects the base station 502 to a packet data network 508, via a communication link 509. Alternatively, each base station 502 may communicate with a base station controller 555 via a communication link 506; the respective base station controller 555, in turn, communicates with the packet data network 508 via a communication link 550. The communication links 509 may include a coaxial cable, a fiber optic cable, a digital radio link, or a telephone line. The communication links 550 may include a coaxial cable, a fiber optic cable, a digital radio link, or a telephone line.

Each base station 502 utilizes four queues (also not shown) for maintaining pending primary and secondary service connection requests. A first queue is for subscriber-initiated primary service connection requests and a second queue is for primary service connection requests transmitted from the circuit switched network 505. A third queue is for subscriber-initiated secondary service connection requests and a fourth queue is for secondary service connection requests transmitted from the packet data network 508.

Each base station 502 also receives random access signals, i.e., signalling connection requests, from the network's subscribers 503, the signalling connection requests requesting subscriber access to the network 501. Each base station 502, then, may have a fifth queue, or other memory storage allocation, for maintaining pending signalling connection requests at it.

In a presently preferred embodiment, each base station 502 has thirty-two uplink/downlink "slot pairs," (also not shown) which comprise the respective base station's 502 over-the-air ("OTA") resource. In particular, a slot pair of a base station 502 is a server for communications between the base station 502 and a subscriber 503. A server on a base station 502 is permanently reserved for the signalling connection requests received by the base station 502; this server can be, but does not have to be, the same base station server all the time. Thus, thirty-one servers on a base station 502 can support primary and secondary service connection requests. In alternative embodiments, more than one server can be reserved for signalling connection requests and/or more than one server at one time, if available, can be allocated to signalling connections in progress.

Figure 6:
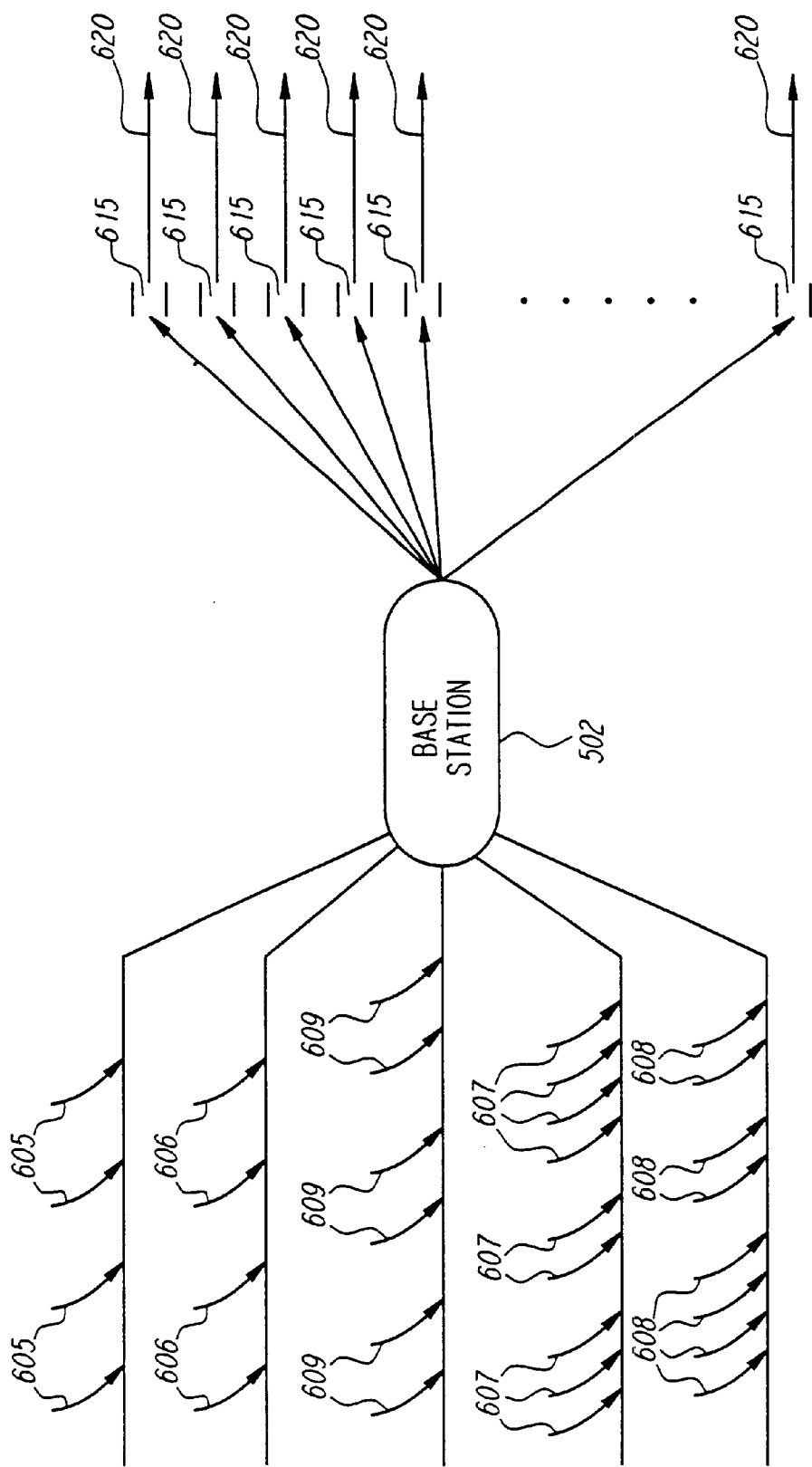
FIG. 6 is a block diagram of a dual service server system that also supports random access signalling.

Referring to FIG. 6, a respective base station 502 receives a plurality of subscriber-initiated primary service connection requests 605, a plurality of network-initiated primary service connection requests 606, a plurality of subscriber-initiated secondary service connection requests 607, a plurality of network-initiated secondary service connection requests 608 and a plurality of signalling connection requests 609. When any connection request 605, 606, 607, 608 or 609 is allocated a respective base station server 615, the connection request becomes a connection in progress 620.

The arrival rates of the primary service connection requests 605 and 606 and the service times of the primary service connections in progress 620 at a respective base station 502 are generally, but not necessarily, identical, irrespective of the originating source, i.e., network-originated or subscriber-originated. The arrival rates of the secondary service connection requests 607 and 608 and the service times for the secondary service connections in progress 620 at a respective base station 502 may also be, but are not necessarily, identical, irrespective of the originating source. However, the connection request arrival rates and the connection in progress service times associated with each service, primary and secondary, differ. In particular, the primary service is characterized by generally slower connection request arrival rates and longer connection in progress service times than the secondary service.

Referring to FIG. 7, a base station 502 of FIG. 6 is equipped with a prior art server controller 710, which is responsible for managing the base station's OTA resource 715. In particular, the server controller 710 of a respective base station is comprised of a server apportioner sub entity 720 and a server surveyor sub entity 725, which are responsible for serving a primary service connection request in preference to a secondary service connection request, and for allocating at least one respective base station server for signalling connection requests. The server surveyor 725 examines the respective base station's OTA resource 715 and determines if one or more servers are idle, and thus, capable of supporting a connection request. In a presently preferred embodiment, each base station has thirty-two uplink/downlink slot pairs, i.e., servers, which comprise the base station's OTA resource 715; an exemplary sixteen of these thirty-two slot pairs 740 are illustrated, for both the respective base station's uplink and downlink. The server apportioner 720 examines four queues of pending primary and secondary connection requests, 730, 731, 732 and 733, and a queue of random access signalling 735, i.e., pending signalling connection requests, and allocates idle servers, i.e., slot pairs 740 which are not allocated to a connection in progress, to the pending connection requests in a prioritized manner. In particular, the server apportioner 720 allocates the signalling connection requests at least one server, and serves the primary service connection requests in preference to the secondary service connection requests.

Figure 8:
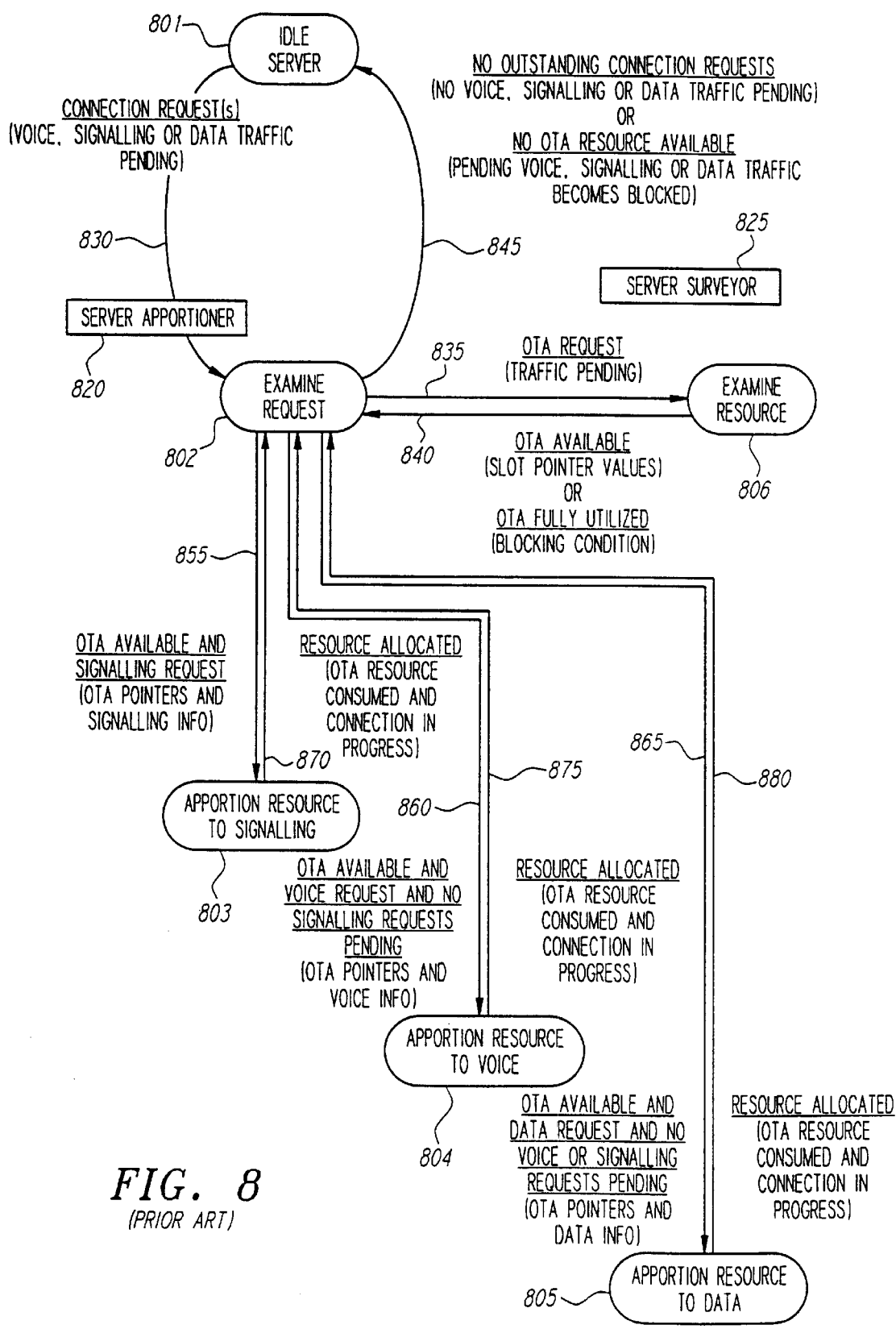
FIG. 8 is a state diagram of a prior art server controller in a dual service network.

FIG. 8 illustrates a state diagram of a prior art server controller (not shown). The server controller is in an idle server state 801 if there are no connection requests pending at the respective base station. If one or more connection requests become pending, the server controller requests the resources of its respective server apportioner 820, and makes an idle to request transition 830, to the examine request state 802.

Upon the idle to request transition 830, the server controller requests the services of its respective server surveyor 825, and makes a request to resource transition 835 to an examine resource state 806. In the examine resource state 806, the server surveyor 825 examines the OTA resource of the respective base station (not shown) and determines the pointers, or indices or addresses to all the possible servers that may currently be utilized to support a connection request, or alternatively, that the OTA resource is fully utilized, i.e., there are no available servers to allocate to a pending connection request, and, thus, a blocking condition exists. The server surveyor 825 then supplies this information to the server apportioner 820, with the server controller making a resource to request transition 840 back to the examine request state 802.

Upon the resource to request transition 840, the server apportioner 820 uses the information supplied by the server surveyor 825 to determine whether or not the server controller may allocate a respective base station server, or servers, to a pending connection request. If the server apportioner 820 determines that there are no connection requests pending at the respective base station, the sever controller makes a request to idle transition 845 to the idle server state 801.

If the server apportioner 820 determines that the server surveyor 825 has identified a blocking condition, the server controller also makes the request to idle transition 845 to the idle server state 801.

If the server apportioner 820 determines that one or more signalling connection requests are pending at the respective base station and that the server surveyor 825 has identified that there is an available base station server, then the server controller makes a request to signalling apportionment transition 855 to an apportion resource to signalling state 803. If the server apportioner 820 determines that one or more primary service connection requests are pending and no signalling connection requests are pending at the respective base station, and that the server surveyor 825 has identified that there is an available base station server, then the server controller makes a request to voice apportionment transition 860 to an apportion resource to voice state 804. If the server apportioner 820 determines that one or more secondary service connection requests are pending and no signalling connection requests or primary service connection requests are pending at the respective base station, and that the server surveyor 825 has identified that there is an available base station server, then the server controller makes a request to data apportionment transition 865 to an apportion resource to data state 805.

In the apportion resource to signalling state 803, the server apportioner 820 examines all the pending signalling connection requests at the respective base station and selects a signalling connection request to be served. If the lifetime, i.e., a specified time limit from when a connection request becomes pending at a respective base station, of the selected signalling connection request has not expired, the server apportioner 820 allocates a base station server, or servers, selected from the possible available server(s) identified by the server surveyor 825, to it, and then the server controller makes a signalling apportionment to request transition 870 back to the examine request state 802. If, however, the lifetime of the selected signalling connection request has expired, the server apportioner 820 discards it from its respective queue, and the server controller makes the signalling apportionment to request transition 870 back to the examine request state 802.

In the apportion resource to voice state 804, the server apportioner 820 examines all the pending primary service connection requests at the respective base station and selects a primary service connection request to be served. If the lifetime of the selected primary service connection request has not expired, the server apportioner 820 allocates a base station server, or servers, selected from the possible available server(s) identified by the server surveyor 825, to it, and then the server controller makes a voice apportionment to request transition 875 back to the examine request state 802. If, however, the lifetime of the selected primary service connection request has expired, the server apportioner 820 discards it from its respective queue, and the server controller makes the voice apportionment to request transition 875 back to the examine request state 802.

In the apportion resource to data state 805, the server apportioner 820 examines all the pending secondary service connection requests at the respective base station and selects a secondary service connection request to be served. If the lifetime of the selected secondary service connection request has not expired, the server apportioner 820 allocates a base station server, or servers, selected from the possible available server(s) identified by the server surveyor 825, to it, and then the server controller makes a data apportionment to request transition 880 back to the examine request state 802. If, however, the lifetime of the selected secondary service connection request has expired, the server apportioner 820 discards it from its respective queue, and the server controller makes the data apportionment to request transition 880 back to the examine request state 802.

Figure 9A:
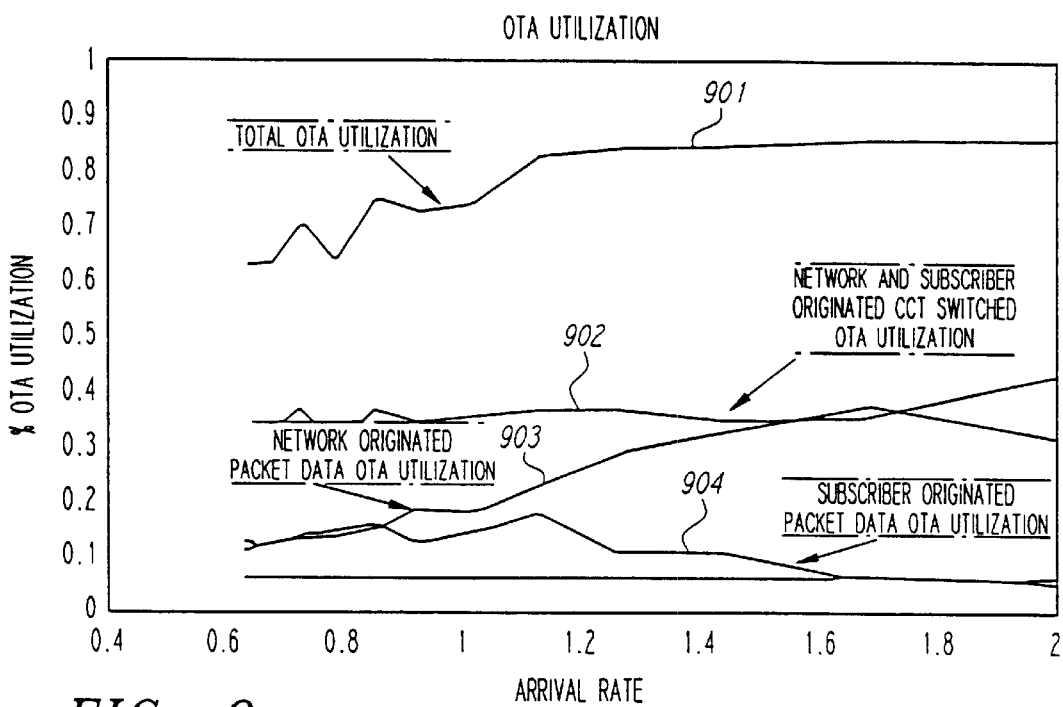
FIG. 9a is a graph depicting exemplary OTA resource utilization for a base station utilizing a prior art server controller.
Figure 9B:
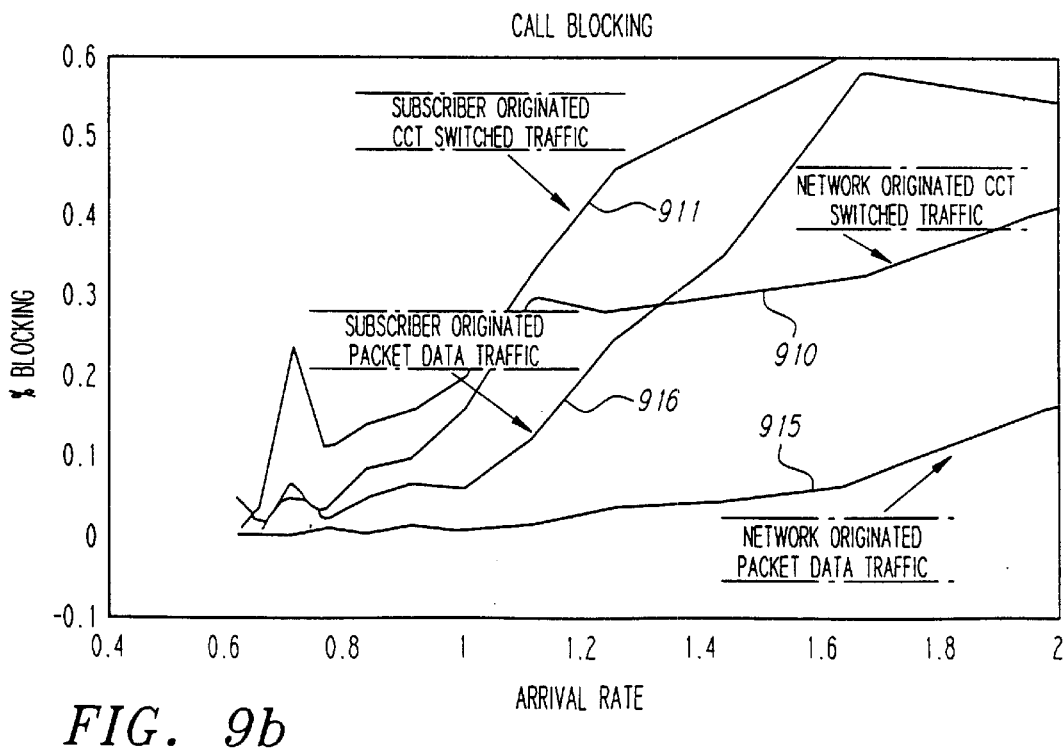
FIG. 9b is a graph depicting exemplary primary and secondary service connection request blocking percentages at a base station utilizing a prior art server controller.

Referring to FIG. 9*a*, an exemplary OTA resource utilization for a respective base station with a server controller 710, as shown in FIG. 7, is illustrated. An arrival rate of 1.0 corresponds to an aggregate primary service, i.e., circuit switched, arrival rate of one connection request every ten seconds and an aggregate secondary service, i.e., packet data, arrival rate of two connection requests per second. (The arrival rate values of FIG. 9*a* and FIG. 9*b* are related to these base rates by a simple scaling factor.) The average service times, i.e., connection in progress times, are one hundred and twenty seconds for the primary service and two seconds for the secondary service. An exemplary total OTA resource utilization 901 of a respective base station is an aggregate of the base station's network-originated and subscriber-originated primary service OTA resource utilization 902, its network-originated secondary service OTA resource utilization 903 and its subscriber-originated secondary service OTA resource utilization 904. The utilization curves of FIG. 9*a* illustrate that subscriber-originated secondary service traffic is penalized in favor of network-originated secondary service traffic; i.e., as the arrival rates of connection requests increase, the respective base station OTA resource utilization by secondary service subscriber-originated traffic 904 decreases while the OTA resource utilization by secondary service network-originated traffic 903 increases.

Referring to FIG. 9*b*, an exemplary blocking rate for primary service network-originated 910 and subscriber-originated 911 connection requests, as well as a blocking rate for secondary service network-originated 915 and subscriber-originated 916 connection requests are illustrated for a respective base station with a server controller 710, as shown in FIG. 7. For all arrival rates above 0.8, the subscriber-originated primary connection requests (curve 911) are blocked at a higher rate than the corresponding subscriber-originated secondary service connection requests (curve 916), and the network-originated primary connection requests (curve 910) are blocked at a higher rate than the corresponding network-originated secondary service connection requests (curve 915). Thus, the exemplary blocking curves 910, 911, 915 and 916 illustrate that the introduction of a secondary, i.e., packet data, service may significantly increase the chance that a primary, i.e., circuit switched, service connection request will be blocked. Therefore, despite the fact that a server controller 710 of FIG. 7 allocates a respective base station server to a pending primary service connection request in preference to a secondary service connection request, blocking of the primary service can still occur.

Figure 10:
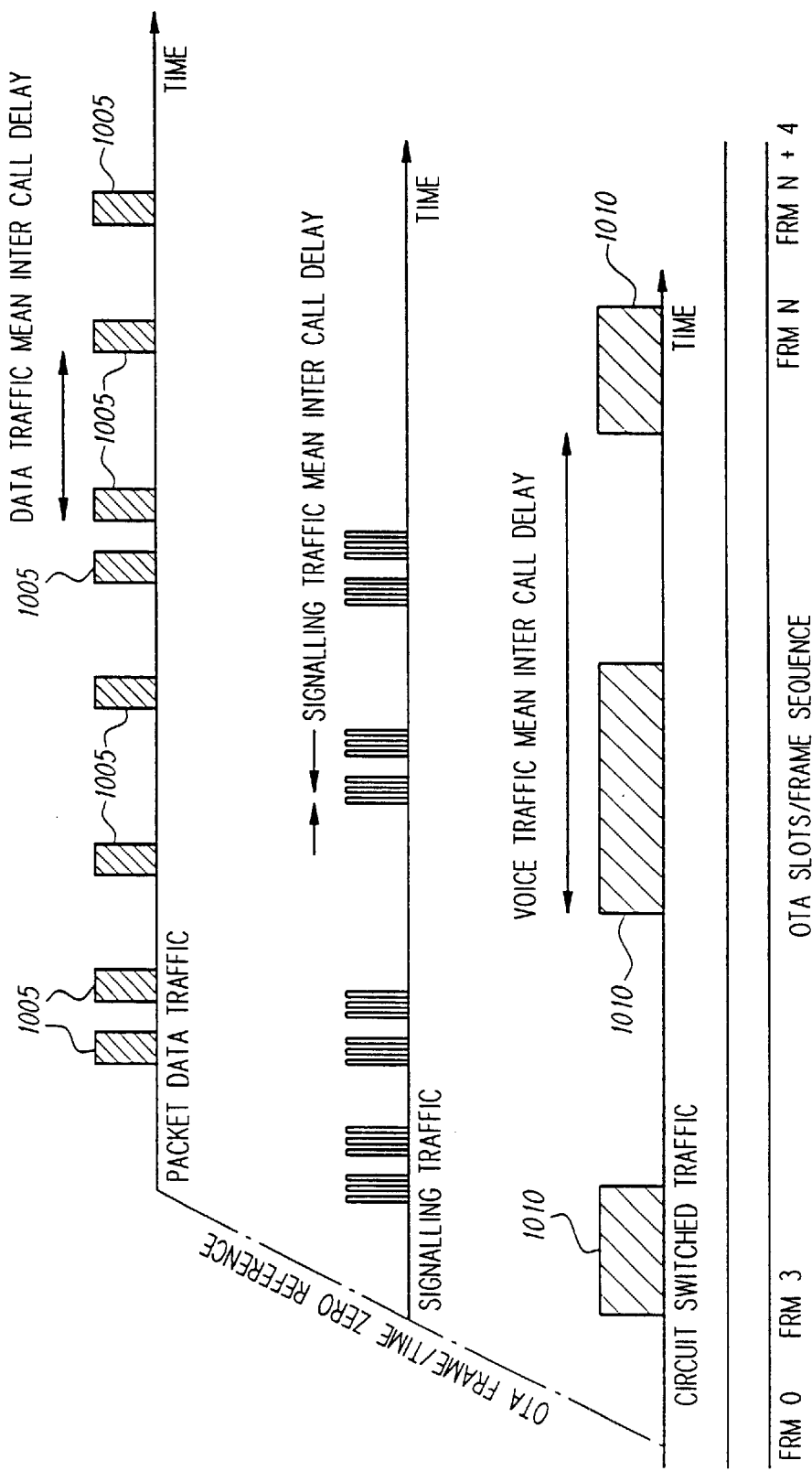
FIG. 10 is a graph depicting exemplary inter call delays at a base station.

FIG. 10 illustrates the fundamental problem; since there is a larger number of secondary service connection requests, i.e., secondary service connection arrivals, 1005, and they occur more frequently than the primary service connection requests (arrivals) 1010, the probability that the last available respective base station slot pair, i.e. server, will be allocated to a secondary service connection request exceeds the probability that it will be allocated to a primary service connection request and, as a consequence, the associated primary service blocking rate increases.

Figure 11:
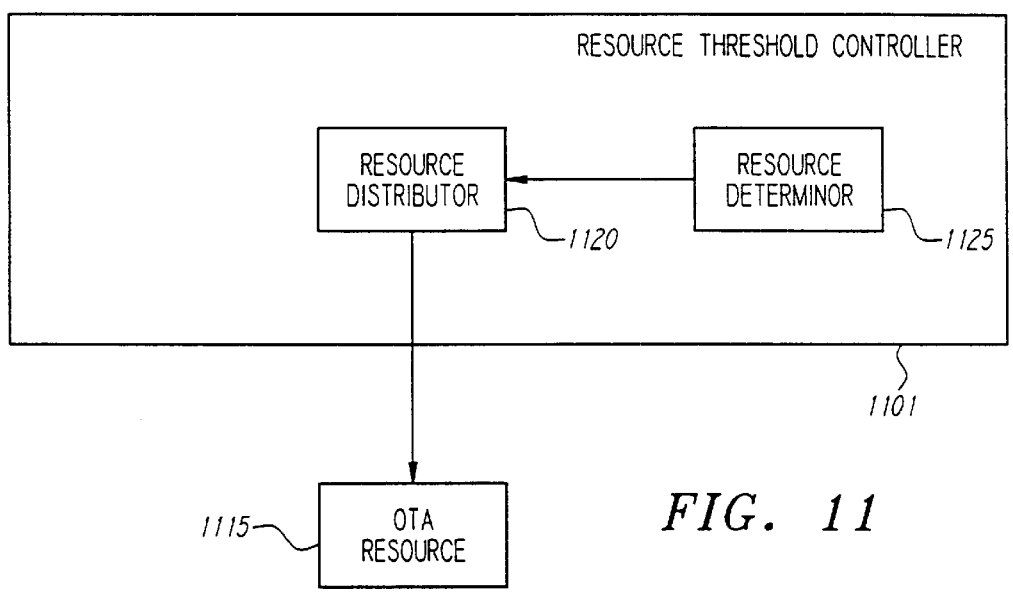
FIG. 11 is a block diagram of a resource threshold controller in accordance with the present inventions employed in a dual service server system.

Thus, referring to FIG. 11, in an embodiment of the present invention, a base station (not shown) is equipped with a resource threshold controller 1101. The resource threshold controller 1101 implements a reserved headroom control rule used to prevent a secondary service connection request from being allocated a respective base station server if the base station OTA resource 1115 cannot support a predetermined number, i.e., a reserved headroom, of primary service connection requests that may arrive at the base station after a base station server is allocated to a secondary service connection request.

The resource threshold controller 1101 is comprised of a resource distributor 1120 and a resource determiner 1125. The resource threshold controller 1101 approach permits the rate of primary service blocking due to server allocation to secondary service connection requests to be controlled by pre-setting a reserved headroom of respective base station servers to be reserved for use by the primary service. In a preferred embodiment, the reserved headroom number of servers can be set by the service provider by an appropriate command to the base station. If the resource threshold controller 1101 determines that allocating a respective base station server to a pending secondary service connection request will cause the available number of idle servers to fall below the reserved headroom, it blocks the secondary service connection request.

If the reserved headroom is set so that the resource threshold controller 1101 maintains the maximum number of possible idle servers for primary service connection requests, than primary service blocking will not occur due to the secondary service because a secondary service connection request will never be allocated a server. However, in this situation, primary service blocking may still occur if the primary service connection request arrival rate is sufficiently high to overtax the respective base station's OTA resource 1115, i.e., the base station's collective servers. Conversely, if the reserved headroom is set to zero, the reserved headroom control rule is effectively disabled, and the secondary service will block the primary service in the manner previously discussed, in particular, in reference to FIG. 4. Thus, a primary service blocking rate can be set by a service provider by judiciously setting the reserved headroom.

Introduction of the reserved headroom control rule ensures that a specified number of base station servers are reserved for use by the primary service.

Figure 12:
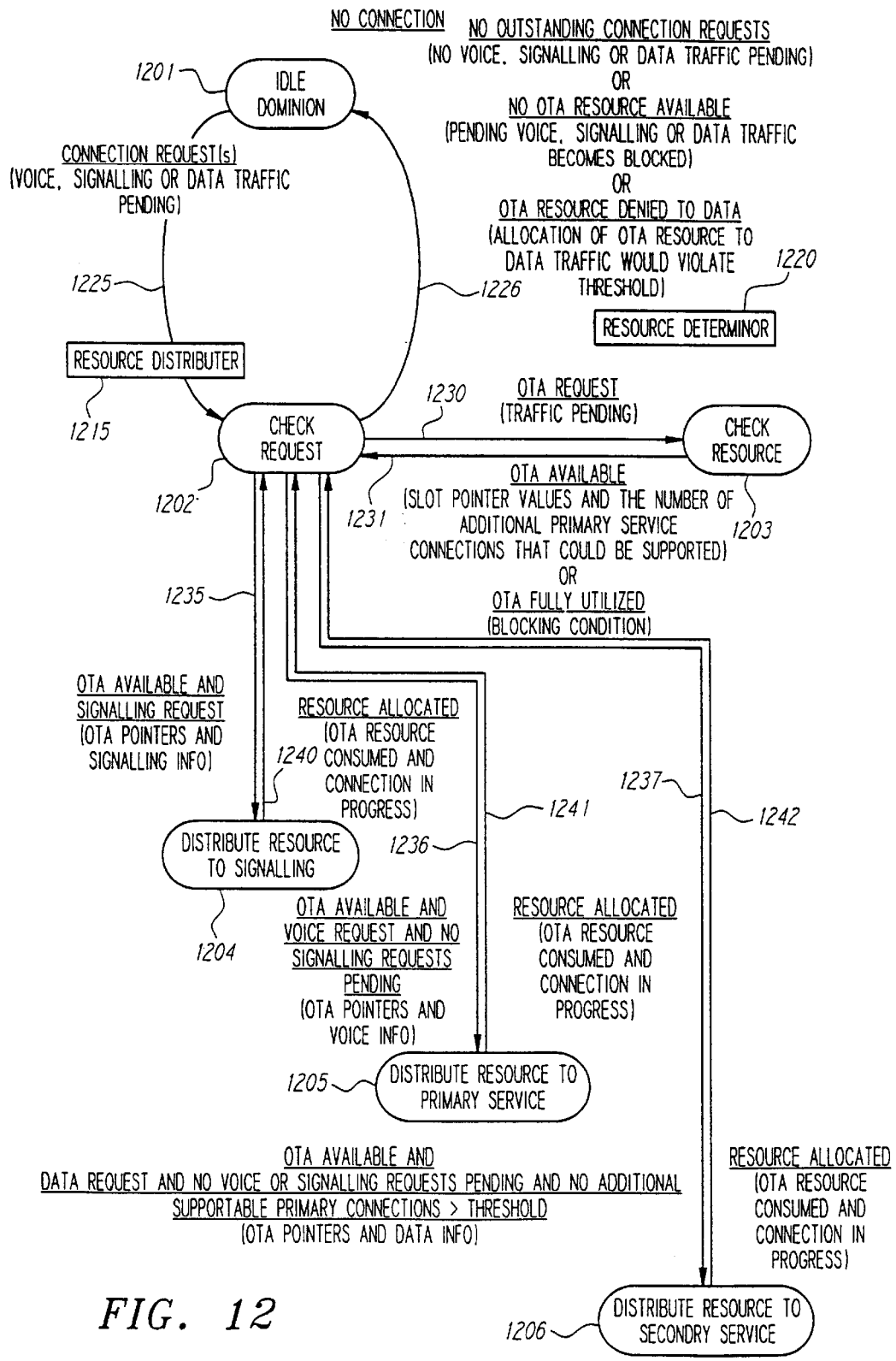
FIG. 12 is a state diagram of a resource threshold controller in a dual service network.

FIG. 12 illustrates a state diagram of a resource threshold controller 1101 of FIG. 11. The resource threshold controller (not shown) is in an idle dominion state 1201 if there are no connection requests pending at the respective base station. If one or more connection requests become pending at the respective base station, the resource threshold controller requests the resources of its resource distributor 1215, and makes an idle to check request transition 1225 to a check request state 1202.

Upon the idle to check request transition 1225, the resource threshold controller requests the services of its resource determiner 1220 and makes a check request to check resource transition 1230 to a check resource state 1203. In the check resource state 1203, the resource determiner 1220 examines the OTA resource of the respective base station and determines the current number of additional connection requests that can be supported, i.e, served, and the pointers, or indices or addresses to all the possible servers that may currently be utilized to support a connection request, or alternatively, that the OTA resource is fully utilized, i.e., there are no available servers to allocate to a pending connection request, and, thus, a blocking condition exists. The resource determinor 1220 then supplies this information to the resource distributor 1215, with the resource threshold controller making a check resource to check request transition 1231 back to the check request state 1202.

Upon the check resource to check request transition 1231, the resource distributor 1215 uses the information supplied by the resource determinor 1220 to determine whether or not the resource threshold controller may allocate a respective base station server, or servers, to a pending connection request. If the resource distributor 1215 determines that there are no connection requests pending at the respective base station, the resource threshold controller makes a check request to idle transition 1226 to the idle dominion state 1201. If the resource distributor 1215 determines that the resource determinor 1220 has identified a blocking condition exists, the resource threshold controller also makes the check request to idle transition 1226 to the idle dominion state 1201.

If the resource distributor 1215 determines that one or more signalling connection requests are pending at the respective base station and that the resource determiner 1220 has identified that there is an available base station server, then the resource threshold controller makes a check request to signalling distribution transition 1235 to a distribute resource to signalling state 1204.

If the resource distributor 1215 determines that one or more primary service connection requests are pending and no signalling connection requests are pending at the respective base station, and that the resource determinor 1220 has identified that there is an available base station server, then the resource threshold controller makes a check request to primary distribution transition 1236 to a distribute resource to primary service state 1205.

If the resource distributor 1215 determines that one or more secondary service connection requests are pending and no signalling or primary service connection requests are pending at the respective base station, that the resource determiner 1220 has identified that there is an available base station server, and that allocation of a base station server to a secondary service connection request will not reduce a reserved headroom number of servers, then the resource threshold controller makes a check request to secondary distribution transition 1237 to a distribute resource to secondary service state 1206. If, however, the resource distributor 1215 determines that one or more secondary service connection requests are pending and no signalling or primary service connection requests are pending at the respective base station, but, although the resource determiner 1220 has identified that there is a server available, it has also identified that allocation of a server to a secondary service connection request will reduce the reserved headroom number of servers, then the resource threshold controller blocks the pending secondary service connection request(s) and makes the check request to idle transition 1226 to the idle dominion state 1201.

In the distribute resource to signalling state 1204, the resource distributor 1215 examines all the pending signalling connection requests at the respective base station and selects a signalling connection request to be served. If the lifetime of the selected signalling connection request has not expired, the resource distributor 1215 allocates a base station server, or servers, selected from the possible available server(s) identified by the resource determiner 1220, to it, and then the resource threshold controller makes a signalling distribution to check request transition 1240 back to the check request state 1202. If, however, the lifetime of the selected signalling connection request has expired, the resource distributor 1215 discards it from its respective queue and the resource threshold controller makes the signalling distribution to check request transition 1240 back to the check request state 1202. In a first embodiment, the selected signalling connection request is the oldest pending signalling connection request at the respective base station. In an alternative embodiment, the selected signalling connection request is based on a priority scheme.

In the distribute resource to primary service state 1205, the resource distributor 1215 examines all the pending primary service connection requests at the respective base station and selects a primary service connection request to be served. If the lifetime of the selected primary service connection request has not expired, the resource distributor 1215 allocates a base station server, or servers, selected from the possible available server(s) identified by the resource determinor 1220, to it, and then the resource threshold controller makes a primary distribution to check request transition 1241 back to the check request state 1202. If, however, the lifetime of the selected primary service connection request has expired, the resource distributor 1215 discards it from its respective queue and the resource threshold controller makes the primary distribution to check request transition 1241 back to the check request state 1202. In a first embodiment, the selected primary service connection request is the oldest pending primary service connection request at the respective base station. In an alternative embodiment, the selected primary service connection request is based on a priority scheme.

Figure 13A:
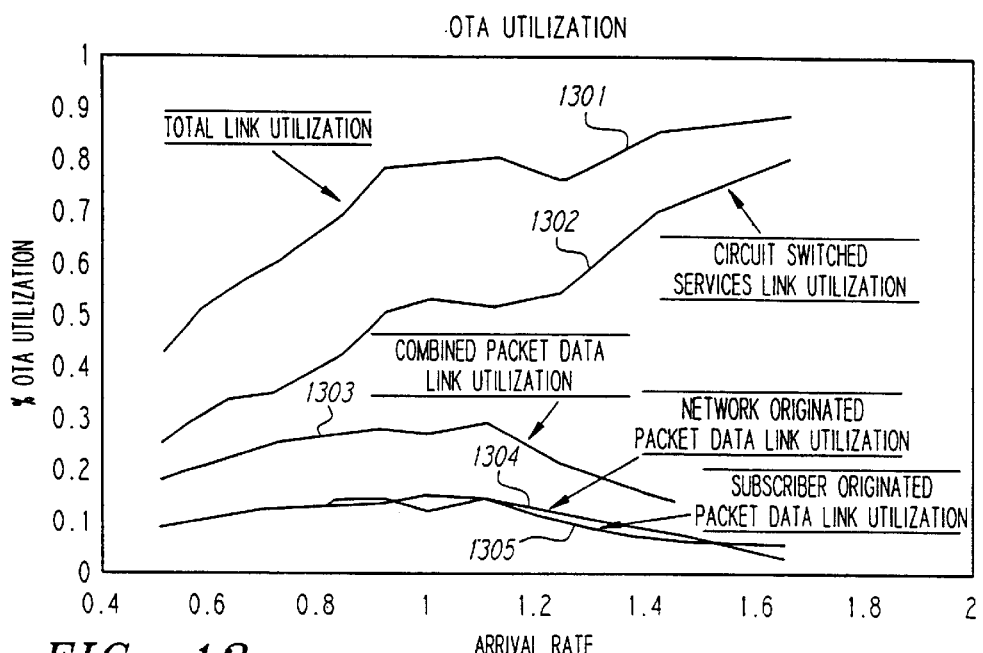
FIG. 13a is a graph depicting exemplary resource utilization for a base station utilizing a resource threshold controller in accordance with the present inventions.

In the distribute resource to secondary service state 1206, the resource distributor 1215 examines all the pending secondary service connection requests at the respective base station and selects a secondary service connection request to be served. If the lifetime of the selected secondary service connection request has not expired, the resource distributor 1215 allocates a base station server, or servers, selected from the possible available server(s) identified by the resource determiner 1220, to it, and then the resource threshold controller makes a secondary distribution to check request transition 1242 back to the check request state 1202. If, however, the lifetime of the selected secondary service connection request has expired, the resource distributor 1215 discards it from its respective queue and the resource threshold controller makes the secondary distribution to check request transition 1242 back to the check request state 1202. In a first embodiment, the selected secondary service connection request is the oldest pending secondary service connection request at the respective base station. In an alternative embodiment, the selected secondary service connection request is based on a priority scheme. Referring to FIG. 13a, a total OTA resource utilization 1301 of a respective base station with a resource threshold controller 1101 as illustrated in FIG. 11, using an exemplary reserved headroom of four servers, is an aggregate of the base station's network-originated and subscriber-originated primary service OTA resource utilization 1302 and the base station's network-originated and subscriber-originated secondary service OTA resource utilization 1303, which itself is an aggregate of the base station's network-originated secondary service OTA resource utilization 1304 and its subscriber-originated secondary service OTA resource utilization 1305. The utilization curves 1302 and 1303 indicate that using a resource threshold controller, a respective base station server is allocated to a primary service connection request in preference to a secondary service connection request, and that as the primary service connection request arrival rate increases, the number of respective base station servers allocated to secondary service connection requests typically decreases.

Figure 13B:
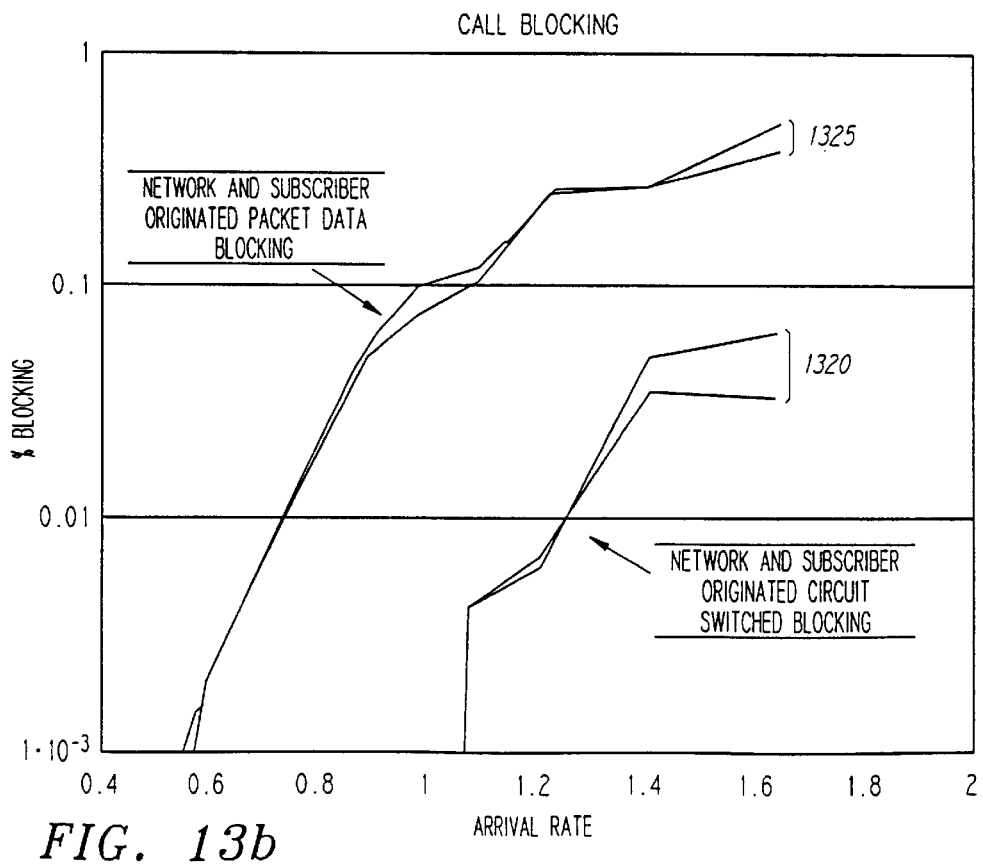
FIG. 13b is a graph depicting exemplary service connection request blocking percentages at a base station utilizing a resource threshold controller in accordance with the present inventions.

Referring to FIG. 13b, exemplary blocking rates for primary service network-originated and subscriber-originated connection requests 1320 for a base station with a resource threshold controller 1101 as illustrated in FIG. 11, using an exemplary reserved headroom of four servers, are lower than corresponding exemplary blocking rates for secondary service network-originated and subscriber-originated connection requests 1325.

The primary service utilization curve 1302 of FIG. 13a and the primary service blocking rate curves 1320 of FIG. 13b further illustrate that when primary service OTA resource utilization rates reach forty to sixty percent, the associated primary service connection request blocking rates are one-tenth to one percent. This infers that the secondary service has little or no impact upon the primary service, as these primary service connection request blocking rates are associated with an ideal operating point.

FIG. 14 illustrates that by varying the reserved headroom for a respective base station using a resource threshold controller 1101 as illustrated in FIG. 11, while the respective primary and secondary service loads, i.e., connection request arrival rates and connection in progress service times, are held constant, the primary service blocking rate can be set to any desired level, at the expense, however, of increasing the secondary service blocking rate. Additionally, if the reserved headroom is made too large, ensuring that the primary service blocking rate is low, then the maximum possible utilization of the respective OTA resource, i.e., servers, by the secondary service is generally not achieved. The situation is exacerbated as the optimum choice of reserved headroom is typically correct for only a specific system loading condition; i.e., a specific number of connections in progress for each system-supported service, with a service-characteristic connection request arrival rate and connection in progress service time.

Figure 15:
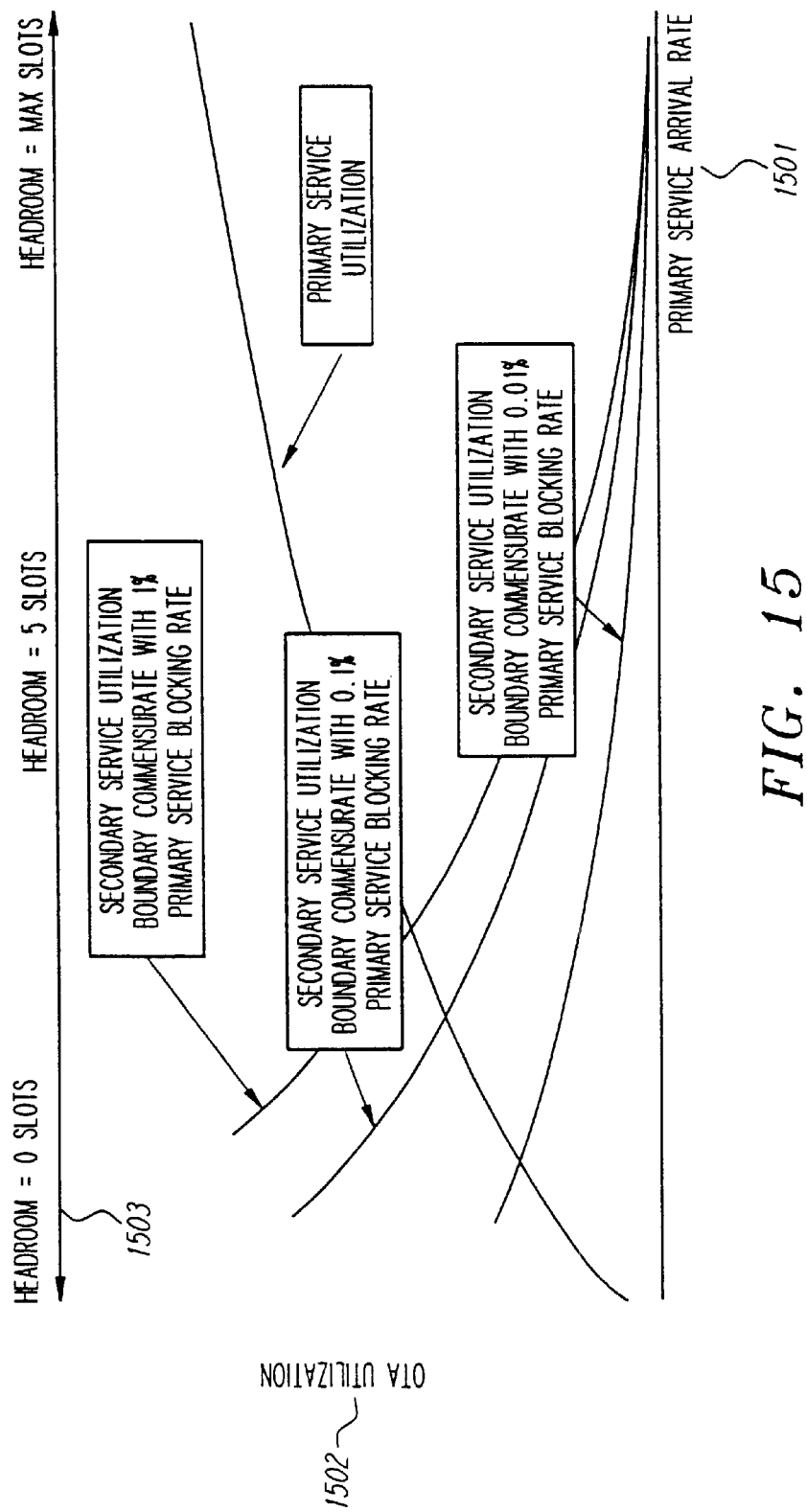
FIG. 15 is a graph depicting exemplary resource utilization at a base station based on a primary service's connection request arrival rate and a reserved headroom.

Referring to FIG. 15, if the primary service connection request arrival rate 1501 at a respective base station is particularly low, then the reserved headroom 1503 should be set low, thereby allowing the secondary service to maximize the OTA resource utilization 1502 of the respective base station. A low reserved headroom in this situation is generally permissible as the probability that multiple primary service connection requests will arrive at any one time is very low. Conversely, if the primary service connection request arrival rate 1501 at a respective base station is relatively high, then the reserved headroom 1503 should also be set high, which minimizes the secondary service's OTA resource utilization 1502 of the respective base station, but ensures that a specified primary service blocking rate is maintained. It remains desirable, however, even with a high primary service connection request arrival rate, to correctly set the reserved headroom so that the secondary service can achieve a maximum OTA resource utilization 1502 of the respective base station.

Figure 16:
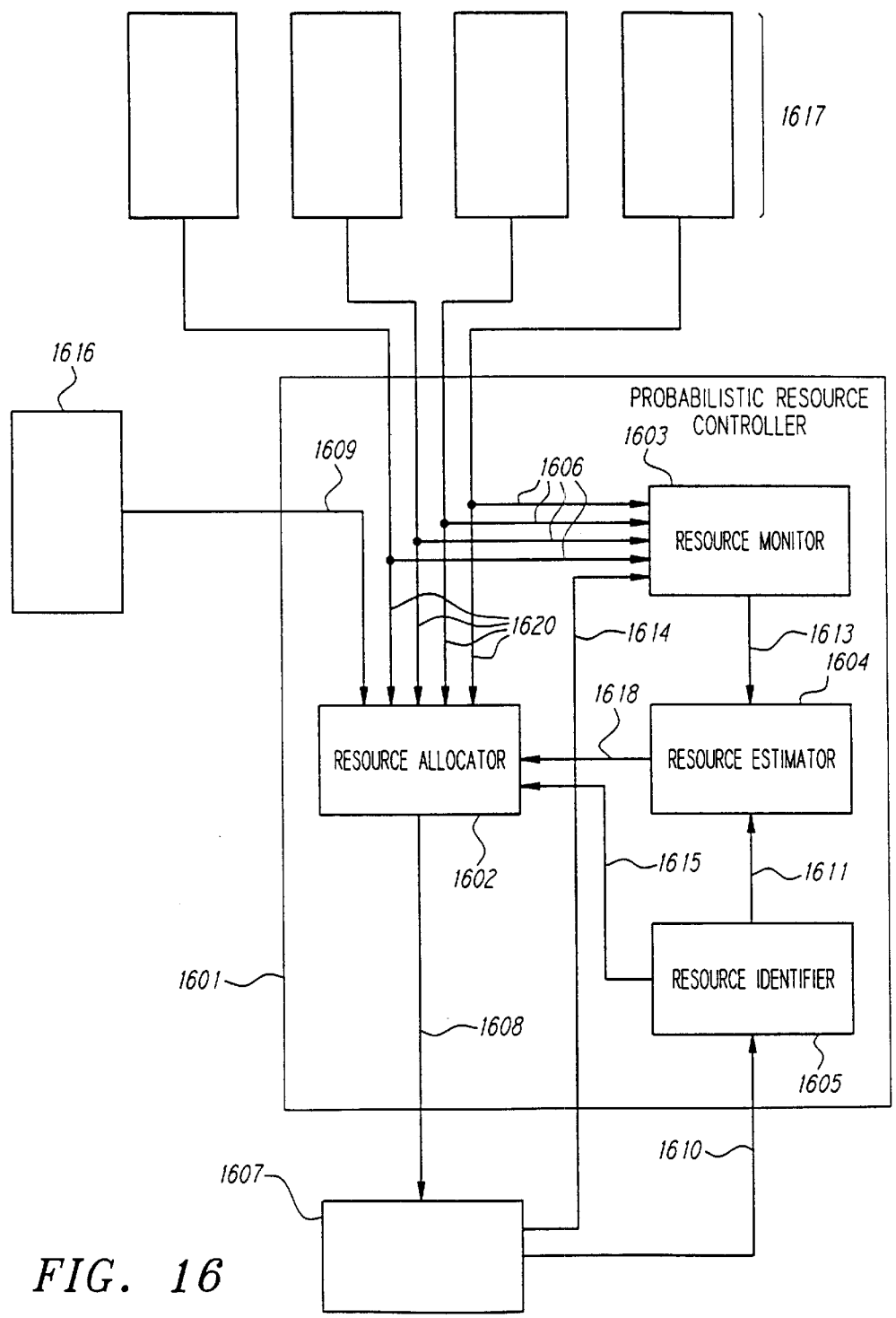
FIG. 16 is a block diagram of a presently preferred probabilistic resource controller in accordance with the present inventions employed in a dual service server system.

Thus, referring to FIG. 16, in a presently preferred embodiment, a base station uses a probabilistic resource controller 1601 comprised of four sub-entities for handling its respective base station's primary and secondary service connection requests and signalling connection requests, and for managing the base station's OTA resource 1607. The probabilistic resource controller 1601 does not utilize a fixed, pre-determined reserved headroom number of servers; instead, it uses a probabilistic reserved headroom control rule wherein it re-assesses and updates an optimum reserved headroom to be utilized for the respective base station. The optimum reserved headroom is the number of respective base station servers reserved for primary service connection requests that ensures that the primary service blocking rate at a respective base station is maintained at a desired value, while still allowing the secondary service to maximize utilization of the base station's servers. In a presently preferred embodiment, the primary service blocking rate for a respective base station may be set by the service provider by an appropriate command to the base station.

A first sub entity of the probabilistic resource controller 1601 is a resource monitor 1603. The resource monitor 1603 has a first group of inputs 1606 comprised of the respective base station's four pending connection request queues 1617 for the primary and secondary services; i.e., a primary service network-originated pending connection request queue, a primary service subscriber-originated pending connection request queue, a secondary service network-originated pending connection request queue and a secondary service subscriber-originated pending connection request queue.

The resource monitor 1603 has a second input 1614 comprising status information retrieved from the respective base station's OTA resource 1607; i.e., the base station's servers. The resource monitor 1603 examines the respective base station's primary and secondary service connection requests and determines their average arrival rates. In particular, the resource monitor 1603 estimates the primary service connection request arrival rate, $\lambda_p$, and the secondary service connection request arrival rate, $\lambda_s$; i.e., the number of primary and secondary service connection requests received by the respective base station per second. The resource monitor 1603 also assesses the average service times of both the primary and secondary service connections in progress; i.e., the average time a respective server 1607 is utilized when a connection request for the service has been allocated a server 1607. In particular, the resource monitor 1603 estimates the average primary service time, $\mu_p$, and the average secondary service time, $\mu_s$, for the respective base station.

To ensure that the statistics derived by the resource monitor 1603 are accurate, it may monitor the respective OTA resource 1607 directly, via its input 1614, utilizing an appropriate monitoring technique. The estimates of the parameter values derived by the resource monitor 1603, i.e., $\lambda_p$, $\lambda_s$, $\mu_p$, and $\mu_s$, which can be obtained from any accurate standard or available technique, comprise the resource monitor's output 1613.

A second sub entity of the probabilistic resource controller 1601 is a resource identifier 1605. The resource identifier 1605 has a first input 1610 comprising status information from the respective base station's OTA resource 1607. The resource identifier 1605 examines the respective base station's OTA resource 1607 and determines the number of current signalling, primary, $\eta_p$, and secondary, $\eta_s$, connections in progress (not shown). The numbers of connections in progress comprise the first output 1611 of the resource identifier 1605. The resource identifier 1605 also determines if a respective base station server 1607 is currently available to support an additional connection request. If one or more respective servers 1607 are available, the resource identifier 1605 further determines the exact pointers, or indices or addresses to them. If no respective servers 1607 are available, the resource identifier 1605 determines a blocking condition exists; i.e., no connection request can be served. The respective available server pointers, or indices or addresses, or a blocking condition status comprise the resource identifier's second output 1615.

A third sub entity of the probabilistic resource controller 1601 is a resource allocator 1602. The resource allocator 1602 has a first group of inputs 1620 comprised of the respective base station's four pending connection request queues 1617 for the primary and secondary services, and a second input 1609 comprised of a signalling queue 1616 containing the pending signalling connection requests, i.e., random access signals (not shown), received by the respective base station. The resource allocator 1602 has a third input 1615 comprised of the respective resource identifier's output 1615. In particular, the resource allocator's third input 1615 is the available server pointers, or indices or addresses, or the blocking condition status determined by the resource identifier 1605. The resource allocator 1602 has a fourth input 1618 comprised of a respective resource estimator's output 1618. In particular, the resource allocator's fourth input 1618 is the reserved headroom computed by a respective resource estimator 1604. The resource allocator 1602 manages and allocates the respective base station's OTA resource 1607. Thus, the resource allocator 1602 has an output 1608 to the OTA resource 1607 consisting of the allocation(s) of servers 1607 to the respective base station's connection request(s).

The resource allocator 1602 ensures that the service provider's service priority policy is implemented, and that the overall utilization of the OTA resource 1607 is maximized. In particular, the resource allocator 1602 processes a pending signalling connection request in preference to either a pending primary or secondary service connection request, and processes a primary service connection request in preference to a pending secondary service connection request. Further, the resource allocator 1602 does not allocate a pending secondary service connection request an available base station server 1607 if the allocation will reduce the reserved headroom servers. The resource allocator 1602 also ensures equity of server allocations between network-originated and subscriber-originated connection requests for both the primary and secondary services.

A fourth, and final, sub entity of the probabilistic resource controller 1601 is a resource estimator 1604. The resource estimator 1604 has a first input 1613 corresponding to the respective resource monitor's output 1613. In particular, the resource estimator's first input 1613 is the estimates of the parameter values $\lambda_p$, $\lambda_s$, and $\mu_s$ derived by the resource monitor 1603. The resource estimator 1604 has a second input 1611 corresponding to the respective resource identifier's output 1611. In particular, the resource estimator's second input 1611 is the number of primary service connections in progress $\eta_p$, the number of secondary service connections in progress $\eta_s$ and the number of signalling connections in progress on the respective base station, determined by the respective resource identifier 1605. The resource estimator 1604 is responsible for computing an optimal reserved headroom to be used prior to the allocation of a base station server 1607 to a specific connection request. The reserved headroom computed by the resource estimator 1604 comprises its output 1618 to the resource allocator 1602, and ensures that the resource allocator 1602 correctly allocates a respective server 1607 to a secondary service connection request, thereby, maximizing the OTA resource utilization, or, alternatively, correctly denies a secondary service server allocation, thereby maintaining the primary service blocking rate.

The resource estimator 1604 of a respective base station calculates an optimum reserved headroom given a current system operating point. The system's operating point is specified by the parameters $\lambda_p$, $\lambda_s$, $\mu_p$, $\mu_s$, $\eta_p$, and $\eta_s$. Upon acquiring these parameter values from the respective resource identifier 1605 and resource monitor 1603, the resource estimator 1604 computes the probability that N primary service connection requests will arrive within an observation time $t_{obs}$ from the poisson arrival formula:

$$P_{arrival}(N, t_{obs}) = \frac{(\lambda_P \cdot t_{obs})^N \cdot e^{-\lambda_P \cdot t_{obs}}}{N!} \quad \text{Eqn 1}$$

The resource estimator 1604 also computes the probability that k secondary service connections in progress will terminate during the observation time interval $t_{obs}$, given $\eta_s$ secondary service connections in progress, drawn from an exponential process with an average service time $\mu_s$. This probability is expressed in the equation:

$$P_{terminate}(k, \eta_S, \mu_S, t_{obs}) = \quad \text{Eqn 2}$$

$$\frac{\eta_S!}{k! \cdot (\eta_S - k)!} \cdot (\rho(\mu_S, t_{obs}))^k \cdot (1 - \rho(\mu_S, t_{obs}))^{\eta_S - k}$$

where $$\rho(\mu_S, t_{obs}) = \frac{\sum_{i=1}^{L}\left(1 - e^{-\frac{t_{obs}}{\mu_S}\frac{L}{i}}\right)}{L} \quad \text{Eqn 3}$$

and L is an arbitrarily large number.

In a similar manner, the resource estimator 1604 also evaluates the probability that k primary service connections will terminate during the observation time interval $t_{obs}$, given $\eta_p$ primary service connections in progress, drawn from an exponential process with an average service time $\mu_p$. This probability is expressed in the equation:

$$P_{terminate}(k, \eta_P, \mu_P, t_{obs}) = \qquad \text{Eqn 4}$$

$$\frac{\eta_P!}{k! \cdot (\eta_P - k)!} \cdot (\rho(\mu_P, t_{obs}))^k \cdot (1 - \rho(\mu_P, t_{obs}))^{\eta_P - k}$$

where $$\rho(\mu_P, t_{obs}) = \frac{\sum_{i=1}^{L}\left(1 - e^{-\frac{t_{obs}}{\mu_P}\frac{L}{i}}\right)}{L} \qquad \text{Eqn 5}$$

and L is an arbitrarily large number.

The above-specified equations one through five assume that the respective primary and secondary service times are exponentially distributed in length and that the respective primary and secondary service arrival rates are poisson-distributed.

Equations two through five may be used to calculate the maximum number of connections in progress for the respective primary and secondary services that have a ninety-five percent or greater chance of terminating in the time interval $t_{obs}$:

$$terminate95(\eta_P) = \max(\eta) \text{ for which} \qquad \text{Eqn 6a}$$

$$\left(\left(\sum_{\eta}^{(\eta_P)} (P_{terminate}(\eta, \eta_P, \mu_P, t_{obs}))\right) > 0.95\right)$$

$$terminate95(\eta_S) = \max(\eta) \text{ for which} \qquad \text{Eqn 6b}$$

$$\left(\left(\sum_{\eta}^{(\eta_S)} (P_{terminate}(\eta, \eta_S, \mu_S, t_{obs}))\right) > 0.95\right)$$

A potential primary service blocking condition exists if the expected number of primary service connection requests pending at a respective base station within a specific time interval exceeds the number of respective servers that are idle during the same time interval. Using equations one through six above, the resource estimator 1604 can compute a primary service blocking event estimator, which is the probability that if N primary service connection requests were to become pending at a respective base station during some subsequent time interval, i.e., $t_{obs}$, one or more would be blocked:

$$P(blocking) = \qquad \text{Eqn 7}$$

$$\sum_{i=1}^{\text{max no primary connections}} f(P_{arrival}(i, t_{obs}), \text{No avail slots})$$

where $f(P_{arrival}(N,t_{obs}),\text{No avail slots})=0(\text{No avail slots}>i)$    Eqn 8a $f(P_{arrival}(N,t_{obs}),\text{No avail slots})=P_{arrival}(N,t_{obs})$
(No avail slots<i)    Eqn 8b No avail slots$(\eta_p,\eta_s)$=No empty slots+$N_{terminate95}(\eta_p)$+
$N_{terminate95}(\eta_s)$    Eqn 8c If the resource estimator 1604 determines that the probability of blocking, i.e., P(blocking), evaluated by equation seven exceeds a primary service blocking rate defined by the respective base station's service provider, then it may infer that the current level of available headroom is insufficient, and it should inform the respective resource allocator 1602 not to allocate a respective base station server 1607 to any secondary service connection requests at the time. Any pending secondary service connection requests at the base station will not be allocated a respective server until additional servers become available due to the termination of existing primary and secondary service connections in progress at the base station.

With the probabilistic resource controller 1601, as the primary service connection request arrival rate at a base station increases, or, as the average secondary service connection in progress service time at the base station increases, the corresponding probability that a pending secondary service connection request will be allocated a respective server decreases. Also with the probabilistic resource controller 1601, as the number of secondary service connections in progress at a base station decreases, and the number of available respective base station servers decreases, the corresponding probability that a pending secondary service connection request will be allocated a respective server also decreases.

In a presently preferred embodiment, referring to FIG. 17, the resource estimator 1604 of a respective probabilistic resource controller 1601 illustrated in FIG. 16 executes corresponding code instructions of a "probability_of_N_terminating" pseudo code subroutine 1701 to compute equations 6a or 6b above, to calculate the maximum number of primary or secondary service connections in progress at a respective base station with a ninety-five percent or greater chance of terminating in a specific time interval.

Figure 18:
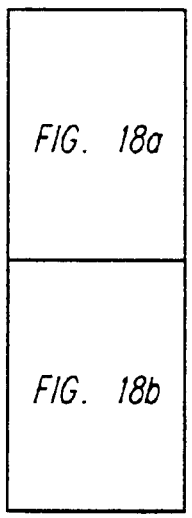
FIG. 18 is pseudo code for a "Resource_estimator" routine employed in accordance with the present inventions.

In a presently preferred embodiment, referring to FIG. 18, the resource estimator 1604 of a respective probabilistic resource controller 1601 illustrated in FIG. 16 executes corresponding code instructions of a "Resource_estimator" pseudo code routine 1801 to compute equations one through eight above, to calculate a reserved headroom for a respective base station for a service provider defined primary service blocking rate corresponding to a "blocking_threshold" parameter 1802.

Figure 19:
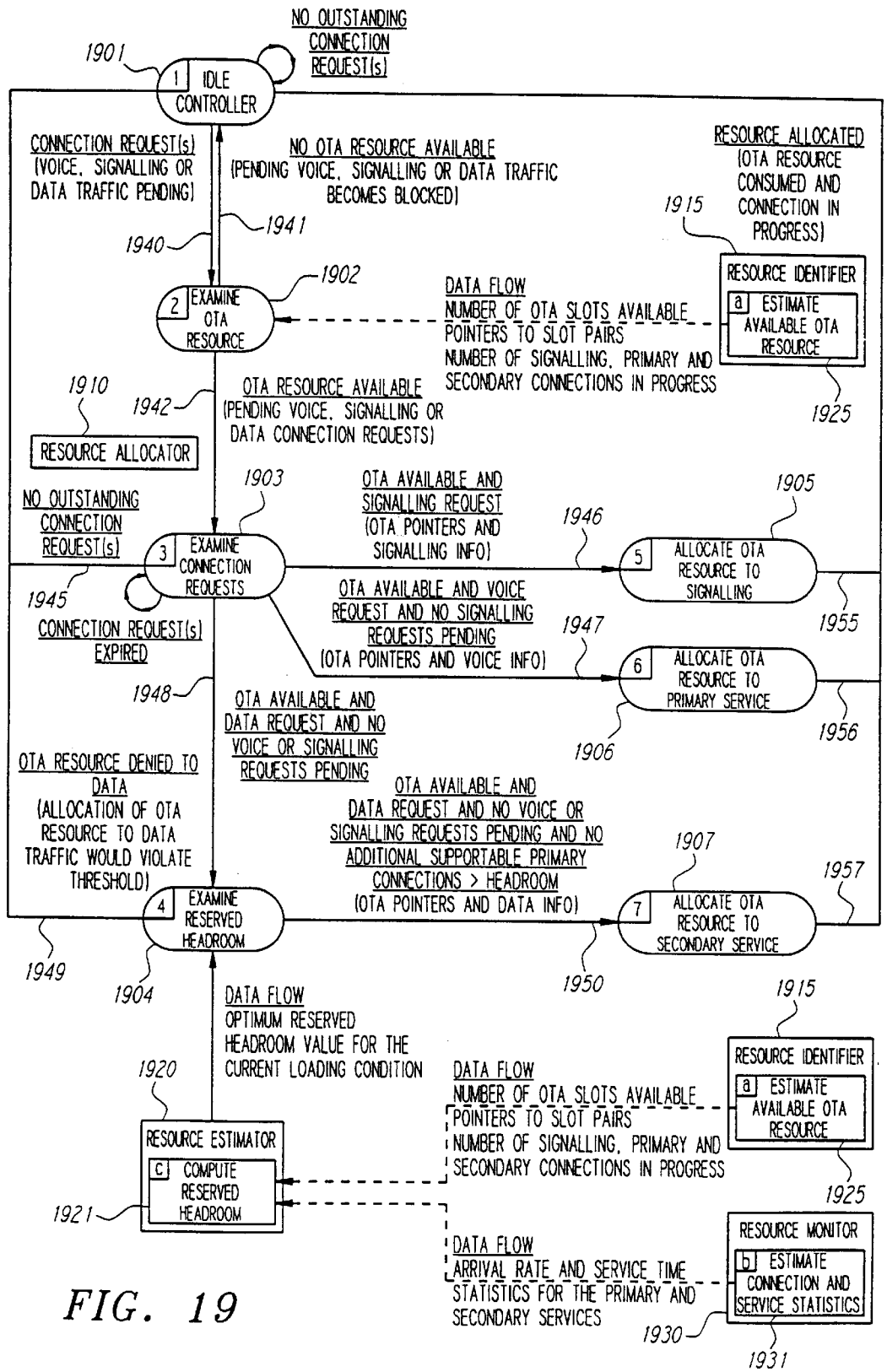
FIG. 19 is a state diagram of a presently preferred probabilistic resource controller employed in a dual service server system.

FIG. 19 illustrates a state diagram of a probabilistic resource controller 1601 (not shown) of FIG. 16. The probabilistic resource controller is in an idle controller state 1901 if there are no connection requests pending at the respective base station. If one or more connection requests become pending at the respective base station, the probabilistic resource controller makes an idle to examine OTA resource transition 1940 to an examine OTA resource state 1902. Upon the idle to examine OTA resource transition 1940, the probabilistic resource controller requests the services of its respective resource identifier 1915. The estimate available OTA resource component 1925 of the resource identifier 1915 examines the current status of the respective base station's OTA resource and determines the number of servers available that could support a new connection in progress, the number of primary and secondary connections in progress, and the pointers, or indices or addresses, to all the possible server and server combinations that could currently support a new connection in progress.

If the estimate available OTA resource component 1925 identifies one or more respective base station servers that are available, the probabilistic resource controller makes an examine OTA resource to examine connect request transition 1942 to an examine connection requests state 1903. If, however, the estimate available OTA resource component 1925 determines that there are no respective base station servers currently available, the probabilistic resource controller declares that all the pending connection requests have encountered a blocking condition, i.e., none can be allocated a server at this time, and makes an examine OTA resource to idle transition 1941 to the idle controller state 1901.

Upon making the examine OTA resource to examine connect request transition 1942, the probabilistic resource controller requests the services of its resource allocator 1910 to examine the respective base station's pending connection requests. The probabilistic resource controller first discards all connection requests from their respective queues for which the resource allocator 1910 has determined that the lifetime of the connection request has expired.

Then, if the resource allocator 1910 determines that there is one or more pending signalling connection requests at the respective base station, the probabilistic resource controller makes an examine connect request to signalling allocation transition 1946 to an allocate OTA resource to signalling state 1905. Otherwise, if the resource allocator 1910 determines that there is one or more pending primary service connection requests and no pending signalling connection requests at the respective base station, the probabilistic resource controller makes an examine connect request to primary allocation transition 1947 to an allocate OTA resource to primary service state 1906. Otherwise, if the resource allocator 1910 determines that there is one or more pending secondary service connection requests and no pending signalling or primary service connection requests at the respective base station, the probabilistic resource controller makes an examine connect request to examine headroom transition 1948 to an examine reserved headroom state 1904. If, however, the resource allocator 1910 determines there are no pending connection requests at the respective base station, the probabilistic resource controller makes an examine connect request to idle transition 1945 to the idle controller state 1901.

In the allocate OTA resource to signalling state 1905, the resource allocator 1910 examines all the pending signalling connection requests at the respective base station and selects a signalling connection request to be served. The resource allocator 1910 then allocates a server, or servers, selected from the possible available server(s) identified by the estimate available OTA resource component 1925 of the respective resource identifier 1915, to the selected signalling connection request, and the probabilistic resource controller then makes a signalling allocation to idle transition 1955 to the idle controller state 1901. In a first embodiment, the selected signalling connection request is the oldest pending signalling connection request at the respective base station. In an alternative embodiment, the selected signalling connection request is based on a priority scheme.

In the allocate OTA resource to primary service state 1906, the resource allocator 1910 examines all the pending primary service connection requests at the respective base station and selects a primary service connection request to be served. The resource allocator 1910 then allocates a server, or servers, selected from the possible available server(s) identified by the respective resource identifier 1915, to the selected primary service connection request, and the probabilistic resource controller then makes a primary allocation to idle transition 1956 to the idle controller state 1901. In a first embodiment, the selected primary service connection request is the oldest pending primary service connection request at the respective base station. In an alternative embodiment, the selected primary service connection request is based on a priority scheme.

In the examine reserved headroom state 1904, the probabilistic resource controller requests the services of its respective resource identifier 1915, resource monitor 1930 and resource estimator 1920. The estimate available OTA resource component 1925 of the resource identifier 1915 examines the current status of the respective base station's OTA resource and determines the number of servers available that could support a new connection in progress, the current numbers of primary, $\eta_p$, and secondary, $\eta_s$, service connections in progress, and the pointers, or indices or addresses, to all the possible server and server combinations that could currently support a new connection in progress. The estimate connection and service statistics component 1931 of the respective resource monitor 1930 monitors the arrival time of each new primary and secondary service connection request and the service time of each primary and secondary service connection in progress at the respective base station, and then computes an average arrival rate, $\lambda_p$ and $\lambda_s$, and an average service time, $\mu_p$ and $\mu_s$, for the respective primary and secondary services. The compute reserved headroom component 1921 of the respective resource estimator 1920 utilizes the parameter values derived by the estimate available OTA resource component 1925 (i.e., $\eta_p$ and $\eta_s$) and the estimate connection and service statistics component 1931 (i.e., $\lambda_p$, $\lambda_s$, $\mu_p$ and $\mu_s$) to compute an optimum reserved headroom to ensure a specified primary service blocking rate is not exceeded.

In the examine reserved headroom state 1904, if the resource allocator 1910 determines that the respective resource estimator 1920 has identified that an allocation of a respective base station server to a secondary service connection request will not reduce the reserved headroom servers, then the probabilistic resource controller makes an examine headroom to secondary allocation transition 1950 to an allocate OTA resource to secondary service state 1907. If, however, the resource allocator 1910 determines that the respective resource estimator 1920 has identified that an allocation of a respective base station server to a secondary service connection request will reduce the reserved headroom servers, then the probabilistic resource controller blocks the pending secondary service connection request(s), i.e., denies a server allocation to the pending secondary service connection request(s), and makes an examine headroom to idle transition 1949 to the idle controller state 1901.

In the allocate OTA resource to secondary service state 1907, the resource allocator 1910 examines all the pending secondary service connection requests at the respective base station and selects a secondary service connection request to be served. The resource allocator 1910 then allocates a server, or servers, selected from the possible available server(s) identified by the estimate available OTA resource component 1925 of the respective resource identifier 1915, to the selected secondary service connection request, and the probabilistic resource controller then makes a secondary allocation to idle transition 1957 to the idle controller state 1901. In a first embodiment, the selected secondary service connection request is the oldest pending secondary service connection request at the respective base station. In an alternative embodiment, the selected secondary service connection request is based on a priority scheme.

Figure 20:
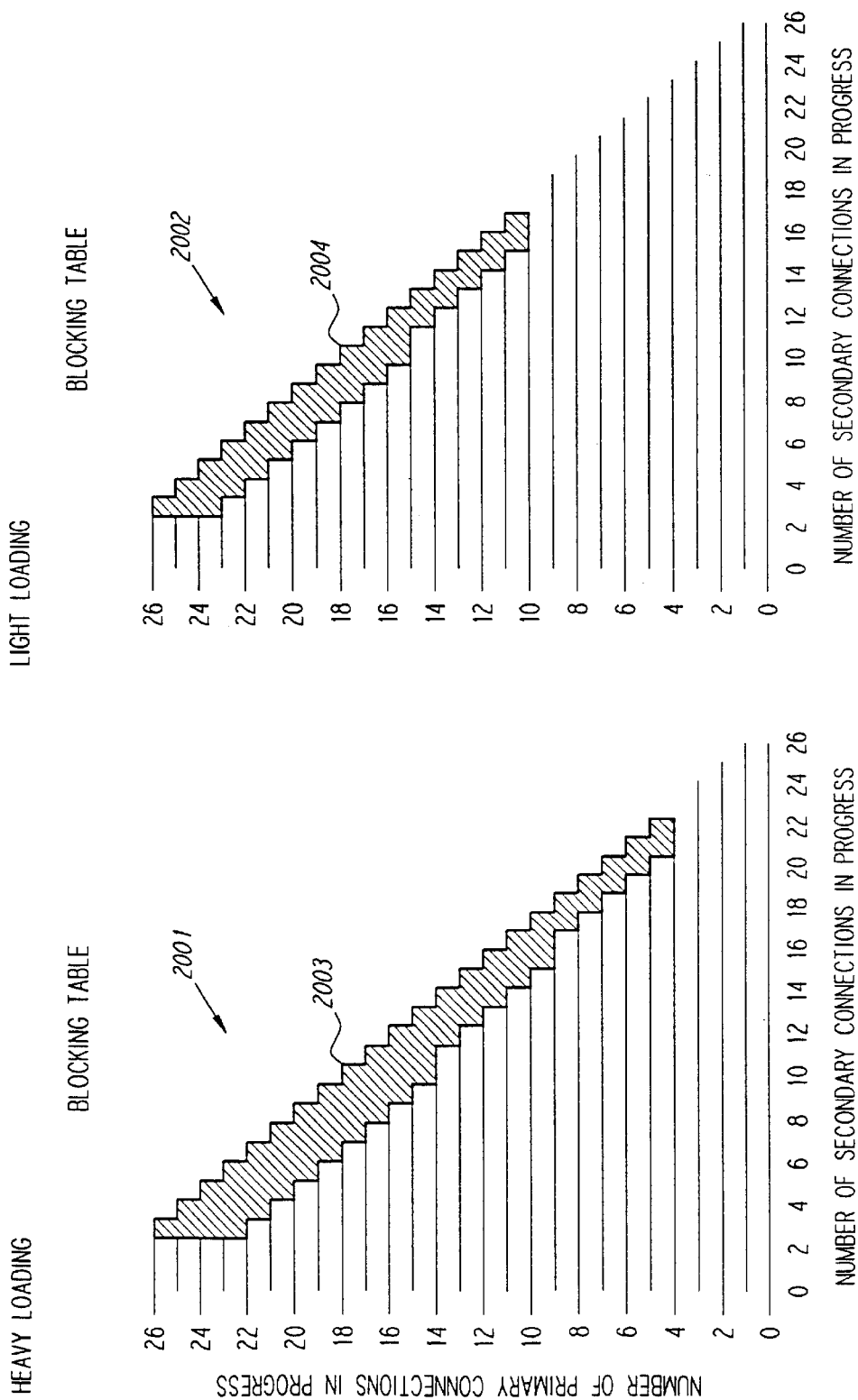
FIG. 20 are exemplary blocking table graphs for a base station with a heavy loading condition and with a light loading condition.

Referring to FIG. 20, shaded entries 2003 and 2004 of respective exemplary blocking tables 2001, for heavy loading conditions at a base station, and 2002, for light loading conditions at the base station, illustrate the combinations of the numbers of primary service and secondary service connections in progress on the base station which will result in a potential primary service blocking condition. These combinations, thus, should be prevented from occurring by the base station's probabilistic resource controller.

In practice, the arrival rates of the secondary service connection requests may be often relatively high; typically one to two requests per second may be received by the respective base station. The resultant computational burden that the resource estimator 1604 of a respective probabilistic resource controller 1601, illustrated in FIG. 16, may experience can be alleviated if the underlying rate of change of the primary and secondary service arrival rates and service times is relatively slow.

Thus, in a more presently preferred embodiment, for a specific base station operating point, a tabulation estimator of a probabilistic tabulation resource controller computes the optimum reserved headroom for each possible combination of primary and secondary connections in progress, using equations one through eight, discussed above, and stores the results in a lookup table, i.e, a "blocking" table. This allows the probabilistic tabulation resource controller's respective tabulation allocator, upon processing a pending secondary service connection request, to immediately look up the desired information as a simple function of the current number of primary and secondary connections in progress, rather than waiting, as may be required of a resource allocator for its respective resource estimator to complete the necessary computations. The blocking table can be updated as a background task by the tabulation estimator, as the respective base station's traffic statistics, i.e., the primary and secondary services' arrival rates and service times, change. In all other aspects, the probabilistic tabulation resource controller is generally structured and functions in a similar manner to a probabilistic resource controller 1601 of FIG. 16.

The arrival rates and service times of the primary and secondary services of a dual service network may not exhibit ideal poisson and exponential distributions. Consequently, the above-defined estimator P(blocking) of equation seven may be either optimistic or pessimistic. Thus, in a most presently preferred embodiment, an adaptive resource controller monitors the true primary service blocking rate experienced by its respective base station and weights future decisions regarding its OTA resource allocations based on the P(blocking) estimate by the true primary service blocking rate. In particular, the responsibilities of an adaptive monitor of a respective adaptive resource controller are expanded from those duties of a resource monitor 1603 of a respective probabilistic resource controller 1601, illustrated in FIG. 16, to also monitor and record the true blocking rate experienced by the primary service on the respective base station.

If the true primary service blocking rate is higher than the blocking rate specified by the service provider, then the blocking threshold, i.e, "blocking_threshold" parameter 1802 of FIG. 18 utilized by the adaptive resource controller in determining whether or not to allocate a respective base station server to a secondary service connection request is decreased. Conversely, if the true primary service blocking rate is less than the service provider specified value, then the blocking_threshold parameter 1802 is increased. A simple proportional control loop may be utilized to implement the necessary adjustments to the blocking_threshold parameter 1802; the control loop, however, must have a long time constant to ensure stability in the adaptive resource controller's algorithm calculations. In particular, the estimation calculations of the true blocking rate and the subsequent updates to the blocking_threshold parameter 1802 should be performed after extended time periods; e.g., the time period between subsequent blocking_threshold parameter updates should be several hours.

In a presently preferred embodiment, in all other aspects, the adaptive resource controller is generally structured and functions in a similar manner to a probabilistic tabulation resource controller.

In another embodiment, historical data on the primary and secondary service arrival rates and service times and the primary service blocking rates at a respective base station collected from different times of the day, week, month, or other useful time frame, may be used by the base station's adaptive resource controller in calculating the optimum reserved headroom for a combination of primary and secondary service connections in progress.

In a presently preferred embodiment, each base station has a processor and associated memory for executing the instructions necessary to perform the above-described resource threshold controller, probabilistic resource controller, probabilistic tabulation resource controller and adaptive resource controller functions.

While preferred embodiments are disclosed herein, many variations are possible which remain within the spirit and scope of the invention. Such variations would become clear to one of ordinary skill in the art after inspection of the specification, drawings and claims herein. The invention therefore is not to be restricted except by the scope of the appended claims.

What is claimed is as follows:

1. A resource controller, said resource controller comprising:
   a resource identifier, said resource identifier comprising an input, said input comprising a first set of status information from a hardware interface, said resource identifier comprising determining the number of primary service connections in progress, and determining the number of secondary service connections in progress, said resource identifier comprising a first output and a second output;
   a resource monitor, said resource monitor comprising a first input, said first input comprising a plurality of queues, said resource monitor comprising a second input, said second input comprising a second set of status information from said hardware interface, said resource monitor comprising an output;
   a resource estimator, said resource estimator comprising a first input, said first input comprising said first output of said resource identifier, said resource estimator comprising a second input, said second input comprising said output of said resource monitor, said resource estimator comprising an output; and
   a resource allocator, said resource allocator comprising a first input, said first input comprising said plurality of queues, said resource allocator comprising a second input, said second input comprising said output of said resource estimator, said resource allocator comprising a third input, said third input comprising said second output of said resource identifier, said resource allocator comprising an output, said output comprising control information for said hardware interface.

2. The resource controller of claim 1, wherein said resource identifier further comprises:
   determining a parameter value to address a resource of said hardware interface that is not allocated, if there is a resource of said hardware interface that is not allocated.

3. The resource controller of claim 2, wherein said resource monitor further comprises:
   computing an average arrival rate of primary service connection requests;
   computing an average arrival rate of secondary service connection requests;

assessing an average time that a primary service connection in progress is allocated a resource; and assessing an average time that a secondary service connection in progress is allocated a resource.

4. The resource controller of claim 3, wherein said resource estimator further comprises computing a threshold value.

5. The resource controller of claim 4, wherein said resource allocator further comprises:

allocating a resource for a secondary service connection if the number of resources available after said allocation is equal to or greater than said threshold value, and not allocating a resource for a secondary service connection if the number of resources available after said allocation will be less than said threshold value.

6. The resource controller of claim 5 wherein said resource estimator is a tabulation estimator comprising:

computing a threshold value for each possible combination of primary service connections in progress and secondary service connections in progress, and storing each said threshold value in an appropriate table entry.

7. The resource controller of claim 6, wherein said resource monitor is an adaptive monitor comprising monitoring the rate at which primary service connection requests are not allocated a resource.

8. A probabilistic resource controller, said probabilistic resource controller comprising:

an idle controller state, said probabilistic resource controller transitioning to said idle controller state when there are no pending connection requests;

an examine OTA resource state, said probabilistic resource controller transitioning to said examine OTA resource state from said idle controller state upon a pending connection request, said probabilistic resource controller transitioning from said examine OTA resource state to said idle controller state if there are no resources available to allocate to said pending connection request;

an examine connection requests state, said probabilistic resource controller transitioning to said examine connection requests state from said examine OTA resource state if there is a resource available to allocate to said pending connection request, said probabilistic resource controller transitioning from said examine connection requests state to said idle controller state if there are no pending connection requests;

an allocate OTA resource to primary service state, said probabilistic resource controller transitioning to said allocate OTA resource to primary service state from said examine connection requests state if said pending connection request is a pending primary service connection request, said probabilistic resource controller transitioning from said allocate OTA resource to primary service state to said idle controller state when said probabilistic resource controller allocates a resource in response to said pending primary service connection request;

an examine reserved headroom state, said probabilistic resource controller transitioning to said examine reserved headroom state from said examine connection requests state if said pending connection request is a pending second service connection request, said probabilistic resource controller transitioning from said examine reserved headroom state to said idle controller state if an allocation of a resource in response to said pending secondary service connection request will result in the number of available resources falling below a threshold value; and an allocate OTA resource to secondary service state, said probabilistic resource controller transitioning to said allocate OTA resource to secondary service state from said examine reserved headroom state if said allocation of a resource in response to said pending secondary service connection request will not result in the number of available resources falling below said threshold value, said probabilistic resource controller transitioning from said allocate OTA resource to secondary service state to said idle controller state when said probabilistic resource controller allocates a resource in response to said pending secondary service connection request.

9. The probabilistic resource controller of claim 8 further comprising an allocate OTA resource to signaling state, said probabilistic resource controller transitioning to said allocate OTA resource to signaling state from said examine connection requests state if said pending connection request is a pending signaling connection request, said probabilistic resource controller transitioning from said allocate OTA resource to signaling state to said idle controller state when said probabilistic resource controller allocates a resource in response to said pending signaling connection request.

10. The probabilistic resource controller of claim 9, further comprising:

said probabilistic resource controller transitioning to said allocate OTA resource to primary service state from said examine connection requests state if said pending connection request is a pending primary service connection request and there are no pending signaling connection requests, and, said probabilistic resource controller transitioning to said examine reserved headroom state from said examine connection requests state if said pending connection request is a pending secondary service connection request and there are no pending signaling connection requests and there are no pending primary service connection requests.

11. A machine readable medium comprising a computer program, said computer program comprising code to accomplish:

allocating a resource for a secondary service connection if the number of resources available after said allocation is equal to or greater than a threshold;

not allocating a resource for a secondary service connection if the number of resources available after said allocation will be less than said threshold; and adaptively controlling the value of said threshold by:
monitoring the rate at which primary service connection requests are not allocated a resource;

decreasing the value of said threshold if said rate is less than a set rate; and increasing the value of said threshold if said rate is greater than said set rate.

12. The computer program of claim 11, wherein a value of said threshold maximizes the allocation of resources in response to primary service connection requests and minimizes the number of secondary service connections requests for which a resource is not allocated.

13. The computer program of claim 11, wherein a value of said threshold is determined by the number of primary service connections allocated a resource and the number of secondary service connections allocated a resource.

14. The computer program of claim 11, wherein said set rate is determined by an operator input.

15. The computer program of claim 11, further comprising code to accomplish accessing a table in a database to determine whether to allocate a resource for a secondary service connection, said table comprising a plurality of entries, each said entry representing a value of said threshold.

16. The computer program of claim 15, further comprising code to accomplish updating said entries of said table.

17. A machine readable medium comprising a computer program, said computer program comprising code to accomplish:

allocating a resource for a secondary service connection if the number of resources available after said allocation is equal to or greater than a threshold;

not allocating a resource for a secondary service connection if the number of resources available after said allocation will be less than said threshold; and adaptively controlling the value of said threshold by:
  accessing a table in a database to determine whether to allocate a resource for a secondary service connection, said table comprising a plurality of entries, each said entry representing a value of said threshold; and
  updating said entries of said table.

18. The computer program of claim 17, wherein a value of said threshold maximizes the allocation of resources in response to primary service connection requests and minimizes the number of secondary service connections requests for which a resource is not allocated.

19. The computer program of claim 17, wherein a value of said threshold is determined by the number of primary service connections allocated a resource and the number of secondary service connections allocated a resource.

20. The computer program of claim 17, further comprising code to accomplish:

monitoring the rate at which primary service connection requests are not allocated a resource;

decreasing the value of said threshold if said rate is less than a set rate; and increasing the value of said threshold if said rate is greater than said set rate.

21. The computer program of claim 20, wherein said set rate is determined by an operator input.

* * * * *

Disclaimer and Dedication 6,282,424—Andrew S. Wright; Helen R. Newton, both of Vancouver (CA); Carl Mansfield, Colorado, CO (US). RESOURCE CONTROLLERS FOR USE IN A NON-UNITARY SERVICE SYSTEM. Patent dated AUG. 28, 2001, Disclaimer filed MAY 2, 2002. by the assignee, Opuswave Networks, Inc., Hereby disclaims and dedicates to the public remaining term of said patent.

*(Official Gazette, September 23, 2003)*